United States Patent
Tanabe et al.

(10) Patent No.: US 10,005,920 B2
(45) Date of Patent: Jun. 26, 2018

(54) POLYMER COMPOSITION HAVING PHOTOALIGNABLE GROUP, LIQUID CRYSTAL ALIGNMENT FILM FORMED OF THE POLYMER COMPOSITION, AND OPTICAL DEVICE HAVING PHASE DIFFERENCE PLATE FORMED OF THE LIQUID CRYSTAL ALIGNMENT FILM

(71) Applicants: JNC CORPORATION, Tokyo (JP); JNC PETROCHEMICAL CORPORATION, Tokyo (JP)

(72) Inventors: Mayumi Tanabe, Chiba (JP); Nagahisa Miyagawa, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days. days.

(21) Appl. No.: 14/792,042

(22) Filed: Jul. 6, 2015

(65) Prior Publication Data
US 2015/0322346 A1    Nov. 12, 2015

Related U.S. Application Data

(63) Continuation of application No. 13/906,656, filed on May 31, 2013, now abandoned.

(30) Foreign Application Priority Data

Jun. 6, 2012 (JP) ................. 2012-128850

(51) Int. Cl.

| | | |
|---|---|---|
| C09D 133/14 | (2006.01) | |
| C09K 19/56 | (2006.01) | |
| G02B 5/30 | (2006.01) | |
| G02F 1/13363 | (2006.01) | |
| G02F 1/1337 | (2006.01) | |
| C08L 33/14 | (2006.01) | |
| C09D 133/04 | (2006.01) | |
| C08L 33/04 | (2006.01) | |
| C09D 143/04 | (2006.01) | |
| G02B 27/28 | (2006.01) | |
| C08L 33/06 | (2006.01) | |

(52) U.S. Cl.
CPC .......... *C09D 133/14* (2013.01); *C08L 33/066* (2013.01); *C09D 143/04* (2013.01); *C09K 19/56* (2013.01); *G02B 5/3083* (2013.01); *G02B 27/286* (2013.01); *G02F 1/13363* (2013.01); *G02F 1/133711* (2013.01); *G02F 1/133788* (2013.01)

(58) Field of Classification Search
CPC .... C08F 130/08; C08F 230/08; C08F 230/85; C08F 220/04–220/08; C08F 220/32; C08F 20/04–20/08; C08F 20/32; C08G 18/728; C08L 33/02; C08L 33/066; C08L 33/068; C08L 33/04; C09D 133/02; C09D 133/12; C09D 133/066; C09D 133/068; C09D 133/04; C09D 143/04; C09K 19/56; G02B 27/286; G02B 5/3083; G02F 1/133711; G02F 1/133788; C09J 133/066; C09J 133/068; C09J 133/04

See application file for complete search history.

(56) References Cited

U.S. PATENT DOCUMENTS

| | | |
|---|---|---|
| 4,219,632 A | 8/1980 | Simms |
| 5,684,084 A | 11/1997 | Lewin et al. |
| 5,932,658 A | 8/1999 | Tanaka et al. |
| 6,107,427 A | 8/2000 | Herr et al. |
| 6,696,114 B1 | 2/2004 | Kawatsuki et al. |
| 8,123,977 B2 | 2/2012 | Oh et al. |
| 2011/0118422 A1 | 5/2011 | Akiike et al. |
| 2011/0135850 A1 | 6/2011 | Saha et al. |
| 2012/0092668 A1 | 4/2012 | Du et al. |
| 2012/0114879 A1* | 5/2012 | Hatanaka ............ C08L 33/066 428/1.2 |
| 2012/0165491 A1 | 6/2012 | Ootsuki et al. |

FOREIGN PATENT DOCUMENTS

| | | |
|---|---|---|
| EP | 0 884 626 | 12/1998 |
| EP | 1 061 404 | 12/2000 |
| JP | 2000-212310 | 8/2000 |
| JP | 2005-275364 | 10/2005 |
| JP | 2012-087286 | 5/2012 |
| WO | 2011/115079 | 9/2011 |

* cited by examiner

*Primary Examiner* — Kregg T Brooks
(74) *Attorney, Agent, or Firm* — Wenderoth, Lind & Ponack, L.L.P.

(57) ABSTRACT

To provide a photoalignable material that can yield a photoalignable film having a high optical uniformity and no alignment defect, and is excellent in sensitivity to allow photoalignment even with exposure in a short period of time, and a liquid crystal alignment film having a high alignment stability of a liquid crystal compound from the photoalignable material. A photoalignable polymer composition containing a specific photoalignable polymer and a specific polymer that is reactive with the photoalignable polymer is manufactured, and the photoalignable film is manufactured by applying the polymer composition onto a base material or the like, drying the applied composition thereon, and irradiating the dried composition with light. Furthermore, the liquid crystal alignment film is manufactured by allowing alignment of molecules of the liquid crystal compound in the photoalignment film.

14 Claims, No Drawings

POLYMER COMPOSITION HAVING PHOTOALIGNABLE GROUP, LIQUID CRYSTAL ALIGNMENT FILM FORMED OF THE POLYMER COMPOSITION, AND OPTICAL DEVICE HAVING PHASE DIFFERENCE PLATE FORMED OF THE LIQUID CRYSTAL ALIGNMENT FILM

TECHNICAL FIELD

The present invention relates to a photoalignable polymer composition, a liquid crystal alignment film formed of the polymer composition, an optical film having the liquid crystal alignment film, and an optical device such as a liquid crystal display device having the optical film. More specifically, the invention relates to a photoalignable polymer composition having a low refractive index, and an excellent transparency, liquid crystal alignment ability, solvent resistance and heat resistance, and an application using the same to an optical use. The photoalignable polymer composition of the invention is suitable particularly for a patterned phase difference plate used for a passive glasses 3D display, a built-in phase difference plate in a liquid crystal display, a color filter overcoat having an optical alignment function, or the like.

BACKGROUND ART

A liquid crystal display device is used in various kinds of liquid crystal display units, including a monitor of a notebook-sized personal computer or a desktop personal computer, a viewfinder of a video camera, a projection display and a television. The liquid crystal display device is further utilized as an optoelectronics-related device such as an optical printer head, an optical Fourier transformation device and a light valve. As a liquid crystal display device that has been applied so far, a display device using a nematic liquid crystal is predominantly applied, and a practical application has been made for a liquid crystal display device having a twisted nematic (TN) mode in which a direction of alignment of liquid crystals in the vicinity of one substrate, and a direction of alignment of liquid crystals in the vicinity of the other substrate are twisted at an angle of 90 degrees, a super twisted nematic (STN) mode in which the directions of alignment are ordinarily twisted at an angle of 180 degrees or more, or a so-called thin-film-transistor (TFT) mode in which a thin-film transistor is used.

However, a viewing angle at which an image can be properly visually recognized is narrow in the liquid crystal display devices, and when the image is viewed from an oblique direction, luminance and contrast may be occasionally decreased, and luminance inversion may be occasionally caused in a halftone. The issue of the viewing angle has been recently improved by a liquid crystal display device having a TN mode in which an optical compensation film is used, a multi-domain vertical alignment (MVA) mode in which a technology of vertical alignment and a technology of protrusion structure are simultaneously applied (see Patent literature No. 1), an in-plane switching (IPS) mode according to a transverse electric mode (see Patent literature No. 2), or the like.

A development of technology on the liquid crystal display device has been achieved not only by an improvement of a driving mode and a device structure as described above but also by an improvement of a component used for the display device. Among the components used for the display device, in particular, a liquid crystal alignment film is one of important elements relating to a display quality of the liquid crystal display device, and a role of the liquid crystal alignment film becomes increasingly important with achieving a high quality of the display device year by year.

The liquid crystal alignment film is required to uniformly control alignment of molecules of liquid crystals for developing uniform display characteristics in the liquid crystal display device. Therefore, the liquid crystal alignment film is required to uniformly align liquid crystal molecules on a substrate in one direction to further develop a fixed tilt angle (pretilt angle) from a substrate surface.

Moreover, in order to realize an improvement in contrast and extension of a viewing angle range in the image display unit, as an optical compensation film or a phase difference film, for example, a stretched film having refractive index anisotropy or a film prepared by aligning and polymerizing a polymerizable liquid crystal compound is used.

In general, the liquid crystal alignment film is formed using a liquid crystal aligning agent. The liquid crystal aligning agent that is mainly used is currently in the form of a solution prepared by dissolving polyamic acid or soluble polyimide into an organic solvent. Such a solution is applied to the substrate, and then a film is formed by a means such as heating, and thus a polyimide liquid crystal alignment film is formed. Various kinds of liquid crystal aligning agents other than polyamic acid are also examined, however, are seldom practically utilized in view of heat resistance, chemical resistance (resistance to liquid crystals), applicability, liquid crystal alignment properties, electric characteristics, optical characteristics, display characteristics and so forth.

Industrially, a rubbing method that is simple and allows high-speed treatment in a large area is widely applied as an alignment treatment method. The rubbing method applies treatment for rubbing a surface of the liquid crystal alignment film in one direction by using a fabric prepared by transplanting fibers of nylon, rayon, polyester or the like, and a uniform alignment of the liquid crystal molecules can be obtained by the treatment. However, dust or static electricity generation or the like is caused by the rubbing method. Thus, an alignment defect or an influence of dust or static electricity generation on the liquid crystal device is regarded as a problem. Moreover, in the case of a patterned phase difference film, control of an alignment pattern by the rubbing treatment is difficult.

Consequently, a development has recently been made for a liquid crystal alignment control method in place of the rubbing treatment. With regard to a photoalignment method by which alignment treatment is applied by irradiation with light, many alignment mechanisms have been proposed, such as a photolysis method, a photoisomerization method, a photodimerization method and a photocrosslinking method (see Patent literature No. 3, Patent literature No. 4, Patent literature No. 5 and Patent literature No. 6.). The photoalignment method applies non-contact alignment, which is different from the rubbing method. In principle, a smaller amount of dust or static electricity is generated by the photoalignment method, as compared with the rubbing treatment.

An improvement in performance as the liquid crystal display device can be expected by controlling a state of alignment of molecules in a liquid crystal monomolecular layer in contact with the liquid crystal alignment film by using a liquid crystal alignment film having good alignment properties to which the alignment treatment is applied by the photoalignment method.

A passive glasses 3D display has been recently practically applied as one of 3D display modes. According to the 3D display, a phase difference plate is mounted on a panel of the liquid crystal display. As the phase difference plate, an examination has been made for a patterned phase difference plate prepared by aligning the polymerizable liquid crystal compound to the liquid crystal alignment film to which the alignment treatment is applied by the photoalignment method. Patterning of the phase difference plate is performed by irradiating a film with polarized ultraviolet light having a different polarization direction to prepare the liquid crystal alignment film, and then applying polymerizable liquid crystals to the film to allow patterning alignment. Upon preparing the patterned phase difference plate, time of exposure to polarized ultraviolet light can influence productivity in a process, but the productivity tends to be further increased as the time of exposure thereto is shorter. Accordingly, in order to shorten the time of exposure to polarized ultraviolet light, an improvement in sensitivity of the photoalignment film to light has been required.

Moreover, a plastic such as triacetyl cellulose (TAC) and a cyclic olefinic polymer may be occasionally used for the substrate for the phase difference plate. Such a plastic including TAC has a lower heat resistance, as compared with glass. Therefore, when polyimide is obtained by applying a solution containing polyamic acid and a high boiling point solvent onto the substrate of the plastic and heating the substrate at a high temperature, use of the resultant polyimide as the liquid crystal alignment film has been difficult in some cases. Furthermore, TAC has a low solvent resistance. Therefore, a solvent that can be used is limited according to the method by which the film is prepared by applying an aligning agent to be the liquid crystal alignment film onto the substrate. For example, polyamic acid that has been used for forming polyimide so far has a low solubility in the solvent that can be applied to TAC, which has been a problem.

CITATION LIST

Patent Literature

Patent literature No. 1: JP 2947350 B.
Patent literature No. 2: JP 2940354 B.
Patent literature No. 3: WO 2011/115079 A.
Patent literature No. 4: JP 2005-275364 A.
Patent literature No. 5: JP 4011652 B.
Patent literature No. 6: JP 2000-212310 A.

SUMMARY OF INVENTION

Technical Problem

An object of the invention is to provide a photoalignable polymer composition that can be aligned even when exposure time is short, and can be dissolved into a solvent applicable to various substrates, and to provide a photoalignment film, typically, a liquid crystal alignment film that is prepared using the polymer composition, and is excellent in solvent resistance, transparency and adhesion, and has a high photoalignment ability to polymerizable liquid crystals.

Solution to Problem

The present inventors have diligently continued to conduct research and development, as a result, have found that the problem described above can be solved by a photoalignable polymer composition containing a specific photoalignable polymer having a polar group and a photoalignable group, and a polymer having a group being reactive with the polar group.

The invention concerns a photoalignable polymer composition, containing as a first component a photoalignable polymer having at least one photoalignable group and at least one polar group selected from a hydroxyl group and a carboxyl group and having none of a group that is reactive with the polar group, and as a second component a polymer having a group that is reactive with the polar group.

The invention also concerns a liquid crystal alignment film formed of the photoalignable polymer composition.

The invention further concerns an optical device having a phase difference plate prepared using the photoalignable polymer composition.

The invention still further concerns a patterned phase difference plate prepared from the photoalignable polymer composition according.

More specifically, the invention is as described below.

Item 1. A photoalignable polymer composition, containing as a first component a photoalignable polymer having at least one photoalignable group and at least one polar group selected from a hydroxyl group and a carboxyl group and having none of a group that is reactive with the polar group, and as a second component a polymer having a group that is reactive with the polar group.

Item 2. The photoalignable polymer composition according to item 1, wherein the polymer of the second component further has a photoalignable group.

Item 3. The photoalignable polymer composition according to item 1 or 2, wherein the photoalignable group included in the photoalignable polymer of the first component is a functional group having a photodimerizable or photoisomerizable structure.

Item 4. The photoalignable polymer composition according to any one of items 1 to 3, wherein the photoalignable group included in the photoalignable polymer of the first component has at least one kind of structures represented by formulas (I-1) to (I-3) below:

Formula 1

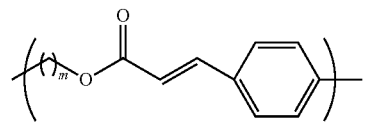
(I-1)

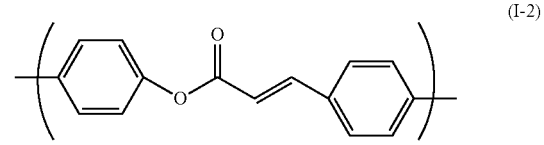
(I-2)

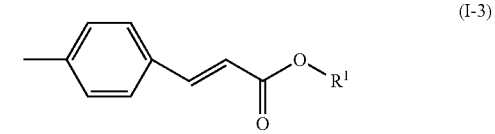
(I-3)

wherein, in the formulas, $R^1$ represents hydrogen or an alkyl group having 1 to 5 carbons in which arbitrary hydrogen may be replaced by fluorine, m represents 2, 4 or 6, and arbitrary hydrogen of a phenylene group may be replaced by fluorine, a methyl group or a methoxy group.

Item 5. The photoalignable polymer composition according to any one of items 1 to 4, wherein the group that is included in the polymer of the second component and reacts with at least one polar group selected from the hydroxyl group and the carboxyl group is at least one group selected from an alkoxysilane group, an isocyanate group, a [1'-methylpropylideneamino]carboxyamino group, a (3,5-dimethylpyrazolyl)carbonylamino group and an epoxy group.

Item 6. The photoalignable polymer composition according to item 5, wherein the group that is included in the polymer of the second component and reacts with at least one polar group selected from the hydroxyl group and the carboxyl group is an alkoxysilane group.

Item 7. The photoalignable polymer composition according to item 6, wherein the polymer of the second component includes at least one kind of constitutional unit represented by formula (II-1-1) below:

Formula 2

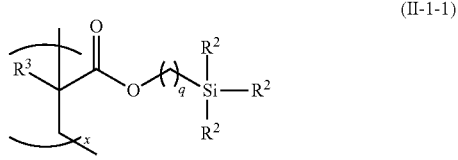

(II-1-1)

wherein, in the formulas, $R^3$ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, $R^2$ each independently represents hydrogen, an alkyl group having 1 to 4 carbons or an alkoxy group having 1 to 4 carbons, at least one of $R^2$ is an alkoxy group having 1 to 4 carbons, q represents an integer from 0 to 10, and x represents a mole fraction.

Item 8. The photoalignable polymer composition according to item 5, wherein the group that is included in the polymer of the second component and reacts with at least one polar group selected from the hydroxyl group and the carboxyl group is at least one group selected from an isocyanate group, a [1'-methylpropylideneamino]carboxyamino group and a (3,5-dimethylpyrazolyl)carbonylamino group.

Item 9. The photoalignable polymer composition according to item 8, wherein the polymer of the second component includes at least one kind of constitutional unit represented by formulas (II-2-1) and (II-3-1) below:

Formula 3

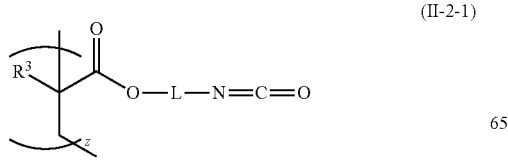

(II-2-1)

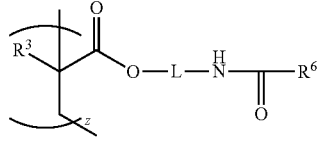

(II-3-1)

wherein, in the formulas, $R^3$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, L represents —$CH_2CH_2$— or —$CH_2CH_2OCH_2CH_2$—, $R^6$ represents a group represented by formula (II-3-1-1) or (II-3-1-2) below, and z is a mole fraction and satisfies a relationship of z≤1.

Formula 4

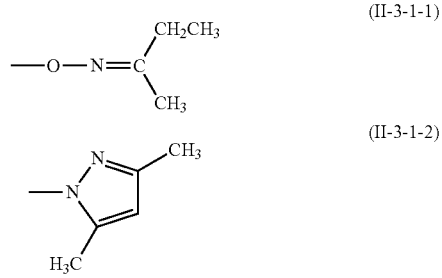

(II-3-1-1)

(II-3-1-2)

Item 10. The photoalignable polymer composition according to item 5, wherein the group that is included in the polymer of the second component and reacts with at least one polar group selected from the hydroxyl group and the carboxyl group is at least one group selected from an epoxy group.

Item 11. The photoalignable polymer composition according to item 10, wherein the polymer of the second component includes at least one kind of constitutional unit represented by formula (II-4-1) below:

Formula 5

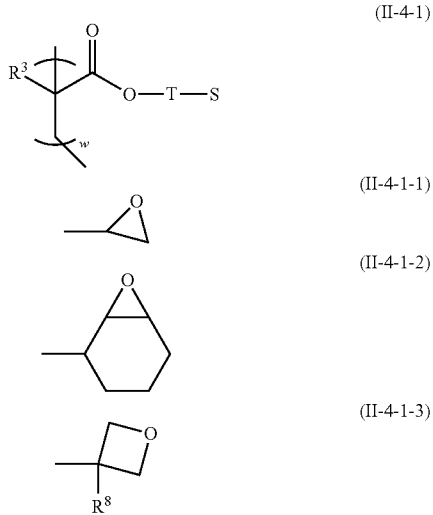

(II-4-1)

(II-4-1-1)

(II-4-1-2)

(II-4-1-3)

wherein, in the formulas, R³ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, T represents a methylene group having 1 to 20 carbons in which oxygen may be substituted for arbitrary carbon (however, oxygen is not substituted for adjacent carbons simultaneously), S represents a group represented by formula (II-4-1-1), (II-4-1-2) or (II-4-1-3), R⁸ represents a methyl group or an ethyl group, and w represents a mole fraction.

Item 12. The photoalignable polymer composition according to any one of items 1 to 11, wherein the photoalignable polymer of the first component includes a constitutional unit derived from a monomer having a photoalignable group, and a constitutional unit derived from at least one kind of monomer selected from the group of acrylic acid, methacrylic acid, hydroxyalkyl(meth)acrylate having a hydroxyalkyl group having 2 to 6 carbons, carboxyl group-containing (meth)acrylate, carboxyl group-containing itaconate and a phenolic hydroxyl group-containing (meth)acrylate.

Item 13. The photoalignable polymer composition according to item 12, wherein the photoalignable polymer of the first component includes at least one kind of constitutional unit represented by formulas (I-1-1) to (I-3-1) below, and at least one kind of constitutional unit derived from hydroxyalkyl(meth)acrylate having a hydroxyalkyl group having 2 to 6 carbons.

alkyl group having 1 to 5 carbons in which arbitrary hydrogen may be replaced by fluorine, or a group represented by formula (I-4) below, R⁷ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, Z¹ represents a single bond, —COO— or —OCO—, o represents an integer from 2 to 10, p represents an integer from 0 to 2, r represents 0 or 1, y¹, y² and y³ represent a mole fraction and satisfy a relationship (0<y¹+y²+y³<1), and arbitrary hydrogen of a phenylene group may be replaced by fluorine, a methyl group or a methoxy group.

Formula 7

wherein, in the formula, R⁸ represents hydrogen or a methyl group, and g represents 0 or 1.

Item 14. The photoalignable polymer composition according to item 12, wherein the photoalignable polymer of the first component includes at least one kind of constitutional unit represented by formulas (I-1-1) to (I-3-1) below, and a constitutional unit derived from at least one kind of Formula 6

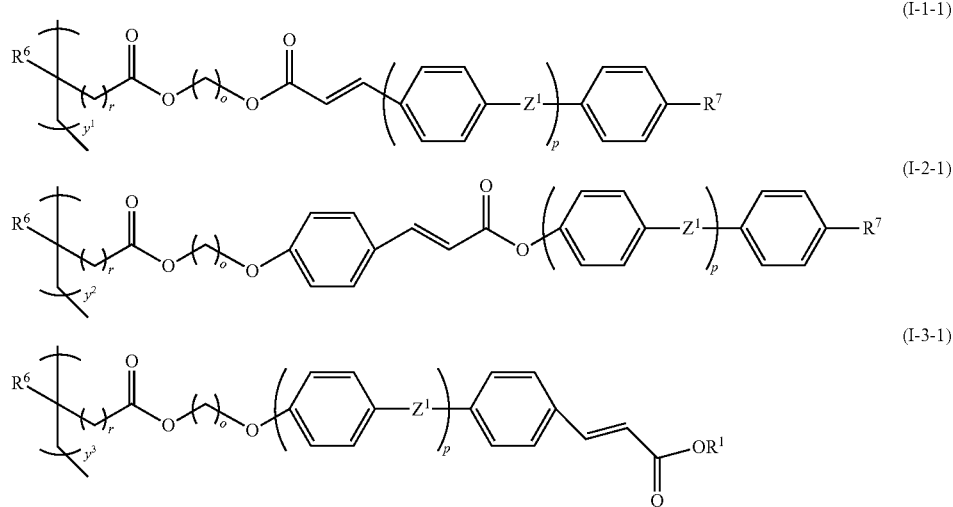

wherein, in the formulas, R¹ represents hydrogen or an alkyl group having 1 to 20 carbons in which arbitrary hydrogen may be replaced by fluorine, R³ represents hydrogen, an monomer selected from carboxyl group-containing (meth)acrylate, carboxyl group-containing itaconate and phenolic hydroxyl group-containing (meth)acrylate.

Formula 8

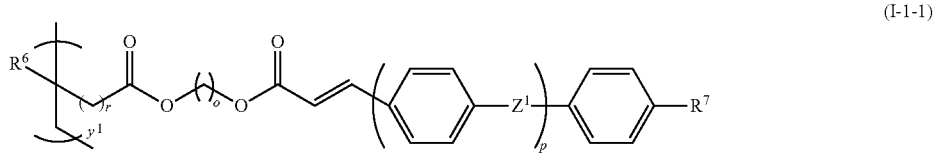

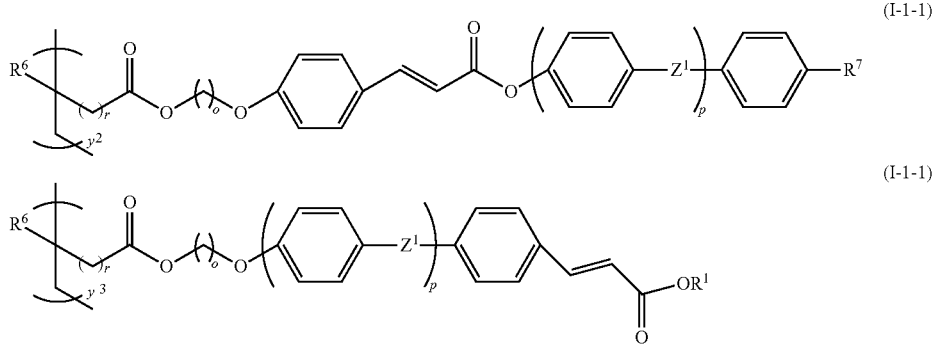

wherein, in the formulas, $R^1$ represents hydrogen or an alkyl group having 1 to 20 carbons in which arbitrary hydrogen may be replaced by fluorine, $R^3$ represents hydrogen, an alkyl group having 1 to 5 carbons in which arbitrary hydrogen may be replaced by fluorine, or a group represented by formula (I-4) below, $R^7$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, $Z^1$ represents a single bond, —COO— or —OCO—, o is an integer from 2 to 10, p is an integer from 0 to 2, r represents 0 or 1, $y^1$, $y^2$ and $y^3$ are a mole fraction and satisfy a relationship ($0<y^1+y^2+y^3<1$), and arbitrary hydrogen of a phenylene group may be replaced by fluorine, a methyl group or a methoxy group.

Formula 9

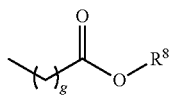

(I-4)

wherein, in the formula, $R^8$ represents hydrogen or a methyl group, and g represents 0 or 1.

Item 15. The photoalignable polymer composition according to item 13, wherein the photoalignable polymer of the first component includes at least one kind of constitutional unit represented by formula (I-1-1) below, and a constitutional unit derived from hydroxyalkyl(meth)acrylate having a hydroxyalkyl group having 2 to 6 carbons, and the polymer of the second component includes a constitutional unit represented by formula (II-1-1) below:

Formula 10

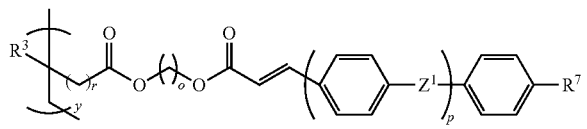

(I-1-1)

wherein, in the formula, $R^3$ represents hydrogen, an alkyl group having 1 to 5 carbons in which arbitrary hydrogen may be replaced by fluorine, or a group represented by formula (I-4) below, $R^7$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, $Z^1$ represents a single bond, —COO— or —OCO—, o represents an integer from 2 to 10, p represents an integer from 0 to 2, r represents 0 or 1, y is a mole fraction (satisfying a relationship: $0<y<1$), and arbitrary hydrogen of a phenylene group may be replaced by fluorine, a methyl group or a methoxy group.

Formula 11

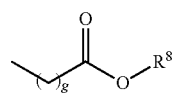

(I-4)

wherein, in the formula, $R^8$ represents hydrogen or a methyl group, and g represents 0 or 1.

Formula 12

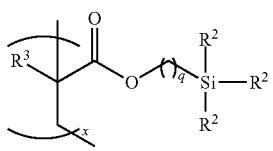

(II-1-1)

wherein, in the formula, $R^3$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, $R^2$ each independently represents hydrogen, an alkyl group having 1 to 4 carbons or an alkoxy group having 1 to 4 carbons, at least one of $R^2$ is an alkoxy group having 1 to 4 carbons, q represents an integer from 0 to 10, and x represents a mole fraction.

Item 16. The photoalignable polymer composition according to item 13, wherein the photoalignable polymer of the first component includes at least one kind of constitutional unit represented by formula (I-2-1) below, and a constitutional unit derived from hydroxyalkyl (meth)acrylate having a hydroxyalkyl group having 2 to 6 carbons, and the polymer of the second component includes a constitutional unit represented by formula (II-1-1) below:

Formula 13

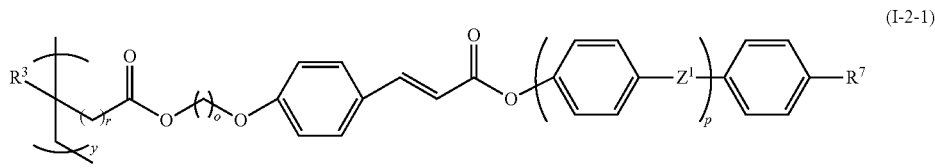
(I-2-1)

wherein, in the formula, $R^3$ represents hydrogen, an alkyl group having 1 to 5 carbons in which arbitrary hydrogen may be replaced by fluorine, or a group represented by formula (I-4) below, $R^7$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, $Z^1$ represents a single bond, —COO— or —OCO—, o represents an integer from 2 to 10, p represents an integer from 0 to 2, r represents 0 or 1, y is a mole fraction (satisfying a relationship: 0<y<1), and arbitrary hydrogen of a phenylene group may be replaced by fluorine, a methyl group or a methoxy group.

Formula 14

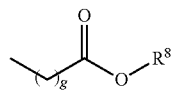
(I-4)

wherein, in the formula, $R^8$ represents hydrogen or a methyl group, and g represents 0 or 1.

Formula 15

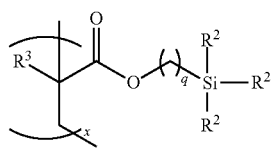
(II-1-1)

wherein, in the formula, $R^3$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, $R^2$ each independently represents hydrogen, an alkyl group having 1 to 4 carbons or an alkoxy group having 1 to 4 carbons, at least one of $R^2$ is an alkoxy group having 1 to 4 carbons, q represents an integer from 0 to 10, and x represents a mole fraction.

Item 17. The photoalignable polymer composition according to item 13, wherein the photoalignable polymer of the first component includes at least one kind of constitutional unit represented by formula (I-3-1) below, and a constitutional unit derived from hydroxyalkyl (meth)acrylate having a hydroxyalkyl group having 2 to 6 carbons, and the polymer of the second component includes a constitutional unit represented by formula (II-1-1) below:

Formula 16

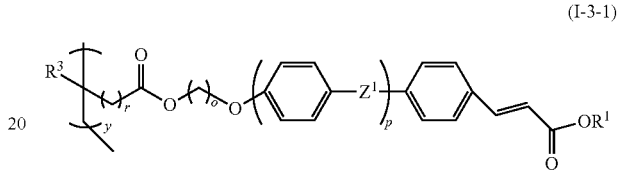
(I-3-1)

wherein, in the formula, $R^1$ represents hydrogen or an alkyl group having 1 to 20 carbons in which arbitrary hydrogen may be replaced by fluorine, $R^3$ represents hydrogen, an alkyl group having 1 to 5 carbons in which arbitrary hydrogen may be replaced by fluorine, or a group represented by formula (I-4) below, $Z^1$ represents a single bond, —COO— or —OCO—, o represents an integer from 2 to 10, p represents an integer from 0 to 2, r represents 0 or 1, y is a mole fraction (satisfying a relationship: 0<y<1), and arbitrary hydrogen of a phenylene group may be replaced by fluorine, a methyl group or a methoxy group.

Formula 17

(I-4)

wherein, in the formula, $R^8$ represents hydrogen or a methyl group, and g represents 0 or 1.

Formula 18

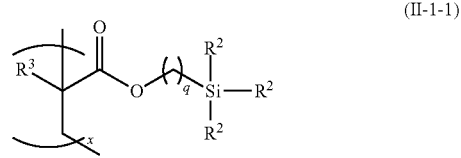
(II-1-1)

wherein, in the formula, $R^3$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, $R^2$ each independently represents hydrogen, an alkyl group having 1 to 4 carbons or an alkoxy group having 1 to 4 carbons, at least one of $R^2$ is an alkoxy group having 1 to 4 carbons, q represents an integer from 0 to 10, and x represents a mole fraction.

Item 18. The photoalignable polymer composition according to item 14, wherein the photoalignable polymer of the first component includes at least one kind of constitutional unit represented by formula (I-1-1) below, and a constitutional unit derived from at least one kind of monomer selected from carboxyl group-containing (meth)acrylate, carboxyl group-containing itaconate and phenolic hydroxyl group-containing (meth)acrylate, and the polymer of the second component includes a constitutional unit represented by formula (II-1-1) below:

Formula 19

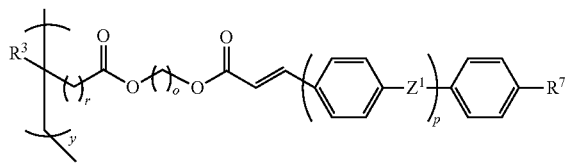
(I-1-1)

wherein, in the formula, $R^3$ represents hydrogen, an alkyl group having 1 to 5 carbons in which arbitrary hydrogen may be replaced by fluorine, or a group represented by formula (I-4) below, $R^7$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, $Z^1$ represents a single bond, —COO— or —OCO—, o represents an integer from 2 to 10, p represents an integer from 0 to 2, r represents 0 or 1, y is a mole fraction (satisfying a relationship: 0<y<1), and arbitrary hydrogen of a phenylene group may be replaced by fluorine, a methyl group or a methoxy group.

Formula 20

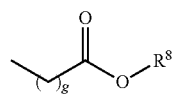
(I-4)

wherein, in the formula, $R^8$ represents hydrogen or a methyl group, and g represents 0 or 1.

Formula 21

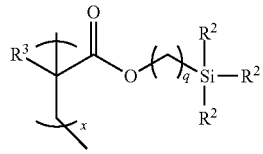
(II-1-1)

wherein, in the formula, $R^3$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, $R^2$ each independently represents hydrogen, an alkyl group having 1 to 4 carbons or an alkoxy group having 1 to 4 carbons, at least one of $R^2$ is an alkoxy group having 1 to 4 carbons, q represents an integer from 0 to 10, and x represents a mole fraction.

Item 19. The photoalignable polymer composition according to item 14, wherein the photoalignable polymer of the first component includes at least one kind of constitutional unit represented by formula (I-2-1) below, and a constitutional unit derived from at least one kind of monomer selected from carboxyl group-containing (meth)acrylate, carboxyl group-containing itaconate and phenolic hydroxyl group-containing (meth)acrylate, and the polymer of the second component includes a constitutional unit represented by formula (II-1-1) below:

Formula 22

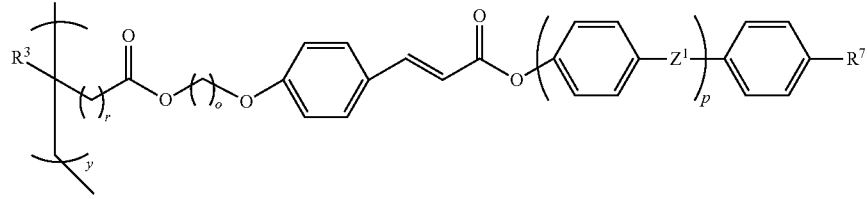
(I-2-1)

wherein, in the formula, $R^3$ represents hydrogen, an alkyl group having 1 to 5 carbons in which arbitrary hydrogen may be replaced by fluorine, or a group represented by formula (I-4) below, $R^7$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, $Z^1$ represents a single bond, —COO— or —OCO—, o represents an integer from 2 to 10, p represents an integer from 0 to 2, r represents 0 or 1, y is a mole fraction (satisfying a relationship: 0<y<1), and arbitrary hydrogen of a phenylene group may be replaced by fluorine, a methyl group or a methoxy group.

Formula 23

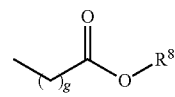
(I-4)

wherein, in the formula, $R^8$ represents hydrogen or a methyl group, and g represents 0 or 1.

Formula 24

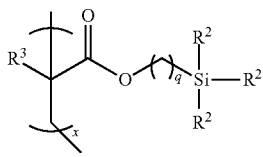
(II-1-1)

wherein, in the formula, $R^3$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, $R^2$ each independently represents hydrogen, an alkyl group having 1 to 4 carbons or an alkoxy group having 1 to 4 carbons, at least one of $R^2$ is an alkoxy group having 1 to 4 carbons, q represents an integer from 0 to 10, and x represents a mole fraction.

Item 20. The photoalignable polymer composition according to item 14, wherein the photoalignable polymer of the first component includes at least one kind of constitutional unit represented by formula (I-3-1) below, and a constitutional unit derived from at least one kind of monomer selected from carboxyl group-containing (meth)acrylate, carboxyl group-containing itaconate and phenolic hydroxyl group-containing (meth)acrylate, and the polymer of the second component includes a constitutional unit represented by formula (II-1-1) below:

Formula 25

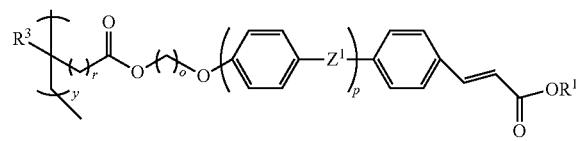
(I-3-1)

wherein, in the formula, $R^1$ represents hydrogen or an alkyl group having 1 to 20 carbons in which arbitrary hydrogen may be replaced by fluorine, $R^3$ represents hydrogen, an alkyl group having 1 to 5 carbons in which arbitrary hydrogen may be replaced by fluorine, or a group represented by formula (I-4) below, $Z^1$ represents a single bond, —COO— or —OCO—, o represents an integer from 2 to 10, p represents an integer from 0 to 2, r represents 0 or 1, y is a mole fraction (satisfying a relationship: 0<y<1), and arbitrary hydrogen of a phenylene group may be replaced by fluorine, a methyl group or a methoxy group.

Formula 26

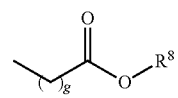
(I-4)

wherein, in the formula, $R^8$ represents hydrogen or a methyl group, and g represents 0 or 1.

Formula 27

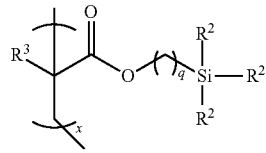
(II-1-1)

wherein, in the formula, $R^3$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, $R^2$ each independently represents hydrogen, an alkyl group having 1 to 4 carbons or an alkoxy group having 1 to 4 carbons, at least one of $R^2$ is an alkoxy group having 1 to 4 carbons, q represents an integer from 0 to 10, and x represents a mole fraction.

Item 21. The photoalignable polymer composition according to item 13, wherein the photoalignable polymer of the first component includes at least one kind of constitutional unit represented by formulas (I-1-1) to (I-3-1) below, and a constitutional unit derived from hydroxyalkyl (meth)acrylate having a hydroxyalkyl group having 2 to 6 carbons, and the polymer of the second component includes a constitutional unit represented by formula (II-2-1) or (II-3-1):

Formula 28

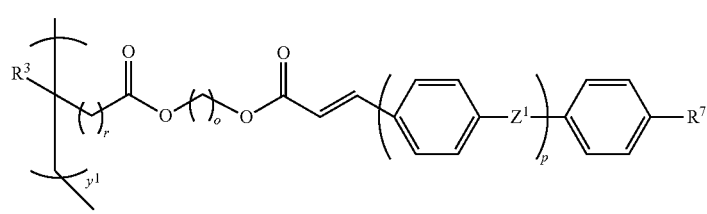
(I-1-1)

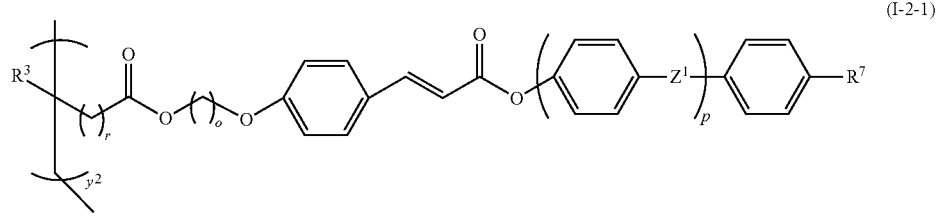
(I-2-1)

-continued (I-3-1)

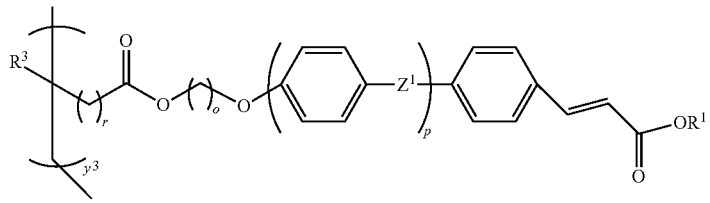

wherein, in the formulas, $R^1$ represents hydrogen or an alkyl group having 1 to 20 carbons in which arbitrary hydrogen may be replaced by fluorine, $R^3$ represents hydrogen, an alkyl group having 1 to 5 carbons in which arbitrary hydrogen may be replaced by fluorine, or a group represented by formula (I-4) below, $R^7$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, $Z^1$ represents a single bond, —COO— or —OCO—, o is an integer from 2 to 10, p is an integer from 0 to 2, r represents 0 or 1, $y^1$, $y^2$ and $y^3$ are a mole fraction and satisfy a relationship ($0<y^1+y^2+y^3<1$), and arbitrary hydrogen of a phenylene group may be replaced by fluorine, a methyl group or a methoxy group:

Formula 29

(I-4)

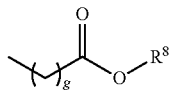

wherein, in the formula, $R^8$ represents hydrogen or a methyl group, and g represents 0 or 1:

Formula 30

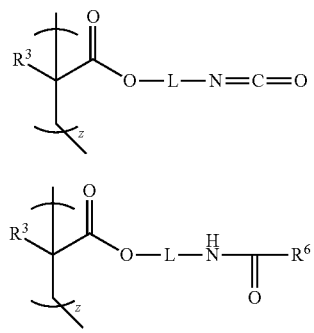

wherein, in the formula, $R^3$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, L represents —CH$_2$CH$_2$— or —CH$_2$CH$_2$OCH$_2$CH$_2$—, $R^6$ represents a group represented by formula (II-3-1-1) or (II-3-1-2), and z represents a mole fraction:

Formula 31

(II-3-1-1)

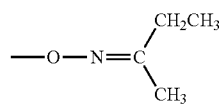

(II-3-1-2)

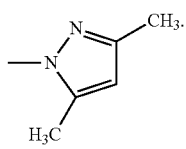

Item 22. The photoalignable polymer composition according to item 14, wherein the photoalignable polymer of the first component includes at least one kind of constitutional unit represented by formulas (I-1-1) to (I-3-1) below, and a constitutional unit derived from at least one kind of monomer selected from carboxyl group-containing (meth)acrylate, carboxyl group-containing itaconate and phenolic hydroxyl group-containing (meth)acrylate, and the polymer of the second component includes a constitutional unit represented by formula (II-4-1) below:

Formula 32

(I-1-1)

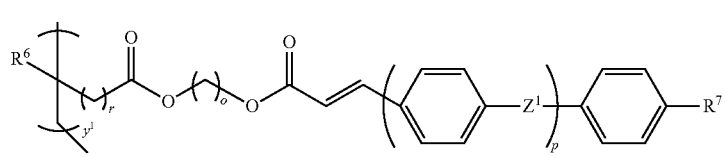

(I-2-1)

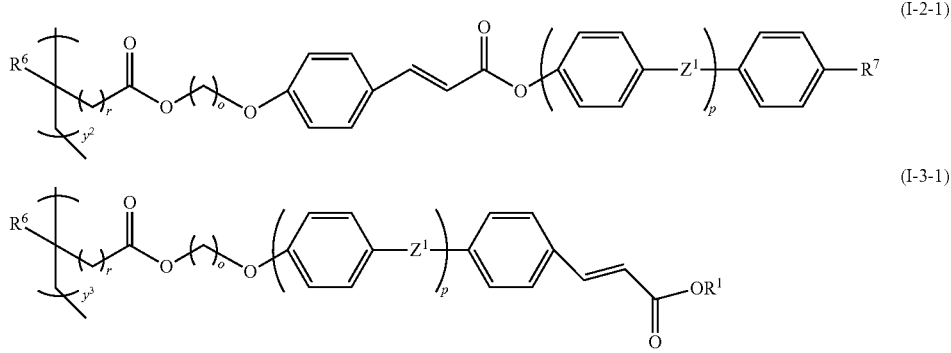

(I-3-1)

wherein, in the formulas, $R^1$ represents hydrogen or an alkyl group having 1 to 20 carbons in which arbitrary hydrogen may be replaced by fluorine, $R^3$ represents hydrogen, an alkyl group having 1 to 5 carbons in which arbitrary hydrogen may be replaced by fluorine, or a group represented by formula (I-4) below, $R^7$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, $Z^1$ represents a single bond, —COO— or —OCO—, o is an integer from 2 to 10, p is an integer from 0 to 2, r represents 0 or 1, $y^1$, $y^2$ and $y^3$ are a mole fraction and satisfy a relationship ($0<y^1+y^2+y^3<1$), and arbitrary hydrogen of a phenylene group may be replaced by fluorine, a methyl group or a methoxy group:

Formula 33

(I-4)

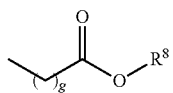

wherein, in the formula, $R^8$ represents hydrogen or a methyl group, and g represents 0 or 1.

Formula 34

(II-4-1)

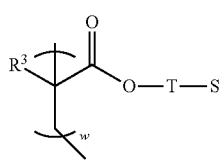

(II-4-1-1)

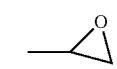

(II-4-1-2)

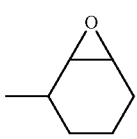

(II-4-1-3)

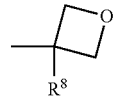

wherein, in the formulas, $R^3$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, T represents a methylene group having 1 to 20 carbons in which oxygen may be substituted for arbitrary carbon (however, oxygen is not substituted for adjacent carbons simultaneously), S represents a group represented by formula (II-4-1-1), (II-4-1-2) or (II-4-1-3), $R^8$ represents a methyl group or an ethyl group, and w represents a mole fraction.

Item 23. The photoalignable polymer composition according to any one of items 1 to 22, wherein a ratio of the first component is in the range of 50.00 to 99.99% by mass and a ratio of the second component is in the range of 0.01 to 50.00% by mass, based on the total mass of the first component and the second component.

Item 24. The photoalignable polymer composition according to any one of items 1 to 22, wherein a ratio of the first component is in the range of 70.00 to 99.50% by mass and a ratio of the second component is in the range of 0.50 to 30.00% by mass, based on the total mass of the first component and the second component.

Item 25. The photoalignable polymer composition according to any one of items 1 to 24, containing at least one kind of material selected from a sensitizer and a crosslinking agent in the range of 1 to 50% by mass based on the total mass of the first component and the second component.

Item 26. The photoalignable polymer composition according to any one of items 1 to 25, containing at least one kind of material selected from an acid compound, a thermal acid generator, and a photoacid generator in the range of 0.01 to 50% by mass based on the total mass of the first component and the second component.

Item 27. The photoalignable polymer composition according to any one of items 1 to 26, further containing a glycol solvent or a glycol ester solvent that can dissolve the first component and the second component.

Item 28. A liquid crystal alignment film formed of the photoalignable polymer composition according to any one of items 1 to 27.

Item 29. An optical device having a phase difference plate prepared using the photoalignable polymer composition according to any one of items 1 to 27.

Item 30. A patterned phase difference plate prepared from the photoalignable polymer composition according to any one of items 1 to 27.

Advantageous Effects of Invention

A photoalignable polymer composition of the invention contains a specific photoalignable polymer having a polar group and a photoalignable group, and a polymer having a group that is reactive with the polar group. Therefore, a photoalignable film obtained by applying a photoaligning agent including the composition to a base material or the like to allow drying has an excellent sensitivity to allow photoalignment even with exposure in a short period of time. Furthermore, a liquid crystal alignment film is prepared by a photoalignment method. Therefore, a complicated treatment process is not required, and neither dust nor static electricity is subsequently generated, while the complicated process and generation of dust and static electricity are seen in rubbing treatment that has been applied so far. Therefore, a liquid crystal alignment film having a high optical uniformity without an alignment defect can be prepared. Thus, a phase difference plate manufactured using the liquid crystal alignment film can keep a high alignment stability.

DESCRIPTION OF EMBODIMENTS

The invention will be explained in detail.

A photoalignable polymer composition of the invention is characterized by containing as a first component a photoalignable polymer having a photoalignable group and at least one polar group selected from a hydroxyl group and a carboxyl group, and having none of a group that is reactive with the polar group, and as a second component a polymer having a group that is reactive with the polar group. Here, the composition may have both the photoalignable group and the polar group in an identical polymer in some cases.

The photoalignable polymer contained as the first component means a polymer in which a change of a molecular structure in the polymer can occur to cause anisotropy by irradiation with light, for example, plane polarized light, typically, a polymer in which at least one photoreaction selected from a photoisomerization reaction, a photodimerization reaction and a photolytic reaction is caused by irradiation with light, for example, plane polarized light. Moreover, the photoalignable group means a group in which a change of a molecular structure in the group can occur by irradiation with light, for example, plane polarized light, typically, a group in which at least one photoreaction selected from a photoisomerization reaction, a photodimerization reaction and a photolytic reaction is caused by irradiation with light, for example, plane polarized light. Among the photoalignable groups, a group in which the photoisomerization reaction is caused and a group in which the photodimerization reaction is caused are preferred, and the group in which the photodimerization reaction is caused is further preferred.

The photoisomerization reaction means a reaction that causes steric isomerization or structural isomerization by action of light. Examples of materials in which the photoisomerization reaction is caused are known, such as a material having a cinnamic acid skeleton (K. Ichimura et al., Macromolecules, 30, 903 (1997)), a material having an azobenzene skeleton (K. Ichimura et al., Mol. Cryst. Liq. Cryst., 298, 221 (1997)), a material having a hydrazono-β-ketoester skeleton (S. Yamamura et al., Liquid Crystals, Vol. 13, No. 2, page 189 (1993)), a material having a stilbene skeleton (J. G. Victor and J. M. Torkelson, Macromolecules, 20, 2241 (1987)), and a material having a spiropyran skeleton (K. Ichimura et al., Chemistry Letters, page 1063 (1992); K. Ichimura et al., Thin Solid Films, Vol. 235, page 101 (1993)).

As the group in which the photoisomerization reaction is caused, a group that includes a C=C bond or N=N bond and undergoes the photoisomerization reaction is preferred. Specific examples of such a group include a group having a cinnamic acid skeleton, a group having an azobenzene skeleton, a group having a hydrazono-β-ketoester skeleton, a group having a stilbene skeleton, and a group having a spiropyran skeleton. The groups may be included in a polymer main chain or side chain.

The photodimerization reaction means a reaction in which an addition reaction occurs between two groups by action of light, and typically, a ring structure is formed. Examples of materials in which the photodimerization is caused known, such as a material having a cinnamic acid skeleton (M. Schadt et al., J. Appl. Phys., Vol. 31, No. 7, page 2155 (1992), a material having a coumarin skeleton (M. Schadt et al., Nature., Vol. 381, page 212 (1996)), a material having a chalcone skeleton (Toshihiro Ogawa et al., Preprints of Symposium on Liquid Crystals (Ekisho Toronkai Koen Yokoshu in Japanese), 2AB03 (1997)), and a material having a benzophenone skeleton (Y. K. Jang et al., SID Int. Symposium Digest, P-53 (1997)).

Specific examples of the groups in which the photodimerization reaction is caused include a group having a cinnamic acid skeleton, a group having a coumarin skeleton, a group having a chalcone skeleton, and a group having a benzophenone skeleton. Among the groups, a group having a cinnamic acid skeleton or a group having a coumarin skeleton is preferred, and a group having a cinnamic acid skeleton is further preferred.

The groups may be included in the polymer main chain or side chain, but is preferably included in the side chain.

Specific examples of the groups having the cinnamic acid skeleton include a group having at least one kind of structure represented by general formulas (I-1) to (I-3) below.

Formula 35

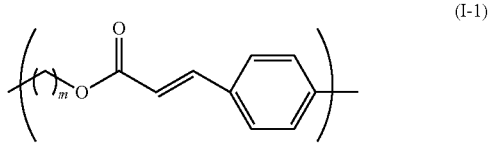
(I-1)

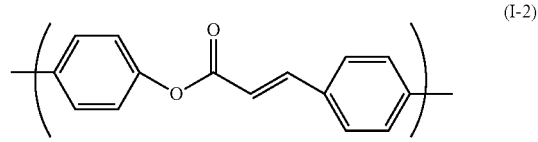
(I-2)

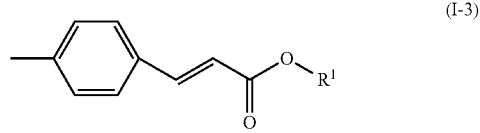
(I-3)

wherein, $R^1$ represents hydrogen or an alkyl group having 1 to 5 carbons in which arbitrary hydrogen may be replaced by fluorine, preferably, a methyl group. Then, m represents an integer from 2 to 10, and m in formula (I-1) preferably represents 2, 4 or 6. Moreover, arbitrary hydrogen of a phenylene group included in the formulas may be replaced by fluorine, a methyl group or a methoxy group. Among the groups represented by the formulas (I-1) to (I-3), a group represented by formula (I-3) is preferred.

In order to introduce the groups represented by formulas (I-1) to (I-3) into the photoalignable polymer forming the first component, for example, at least one of photoalignable polymer monomer forming a constitutional unit represented by formulas (I-1-1), (I-2-1) and (I-3-1) may be polymerized.

Formula 28

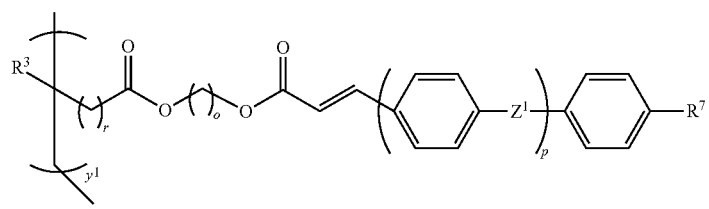

(I-1-1)

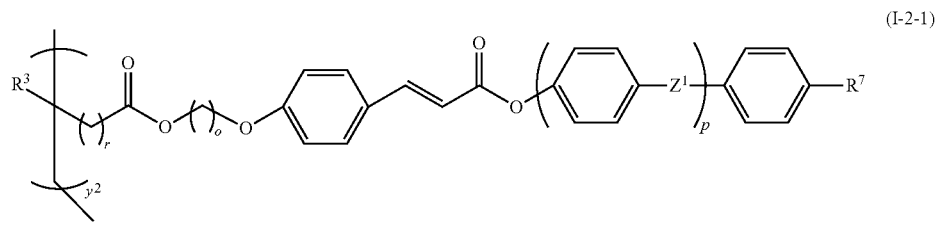

(I-2-1)

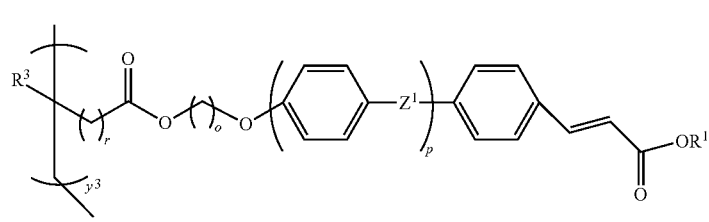

(I-3-1)

1. Arbitrary hydrogen of a phenylene group included in the formulas may be replaced by fluorine, a methyl group or a methoxy group.

Formula 37

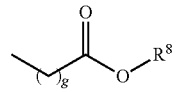

(I-4)

In the formula, $R^8$ represents hydrogen or a methyl group, and g represents 0 or 1.

In the formulas, a parenthesized moiety subscribed with $y^1$, $y^2$ or $y^3$ represents a moiety to be included in the polymer main chain, and $y^1$, $y^2$ and $y^3$ represent a mole fraction $(0 < y^1 + y^2 + y^3 < 1)$ of the constitutional unit included in the photoalignable polymer. In the formulas, $R^1$ represents hydrogen or an alkyl group having 1 to 20 carbons in which arbitrary hydrogen may be replaced by fluorine, $R^3$ represents hydrogen, an alkyl group having 1 to 5 carbons in which arbitrary hydrogen may be replaced by fluorine, or a group represented by formula (I-4) below, $R^7$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, $Z^1$ represents a single bond, —COO— or —OCO—, o represents an integer from 2 to 10, p represents an integer from 0 to 2, and r represents 0 or Content of the constitutional unit (typically the constitutional units represented by formulas (I-1-1), (I-2-1) and (I-3-1)) derived from the monomer having the photoalignable group is ordinarily in the range of approximately 5% by mass to approximately 99.99% by mass, preferably, in the range of approximately 20 to approximately 95.0% by mass, further preferably, in the range of approximately 30 to approximately 90% by mass, based on the total mass of the photoalignable polymer forming the first component.

Specific examples of the photoalignable polymer monomer forming the constitutional unit represented by formula (I-1-1) include monomers represented by formulas (I-1-1-a) to (I-1-1-l) and formulas (I-1-1-m) to (I-1-1-x) below (in the formulas, $R^9$ represents hydrogen or a methyl group, and $R^{10}$ represents an alkyl group having 1 to 20 carbons).

Formula 38
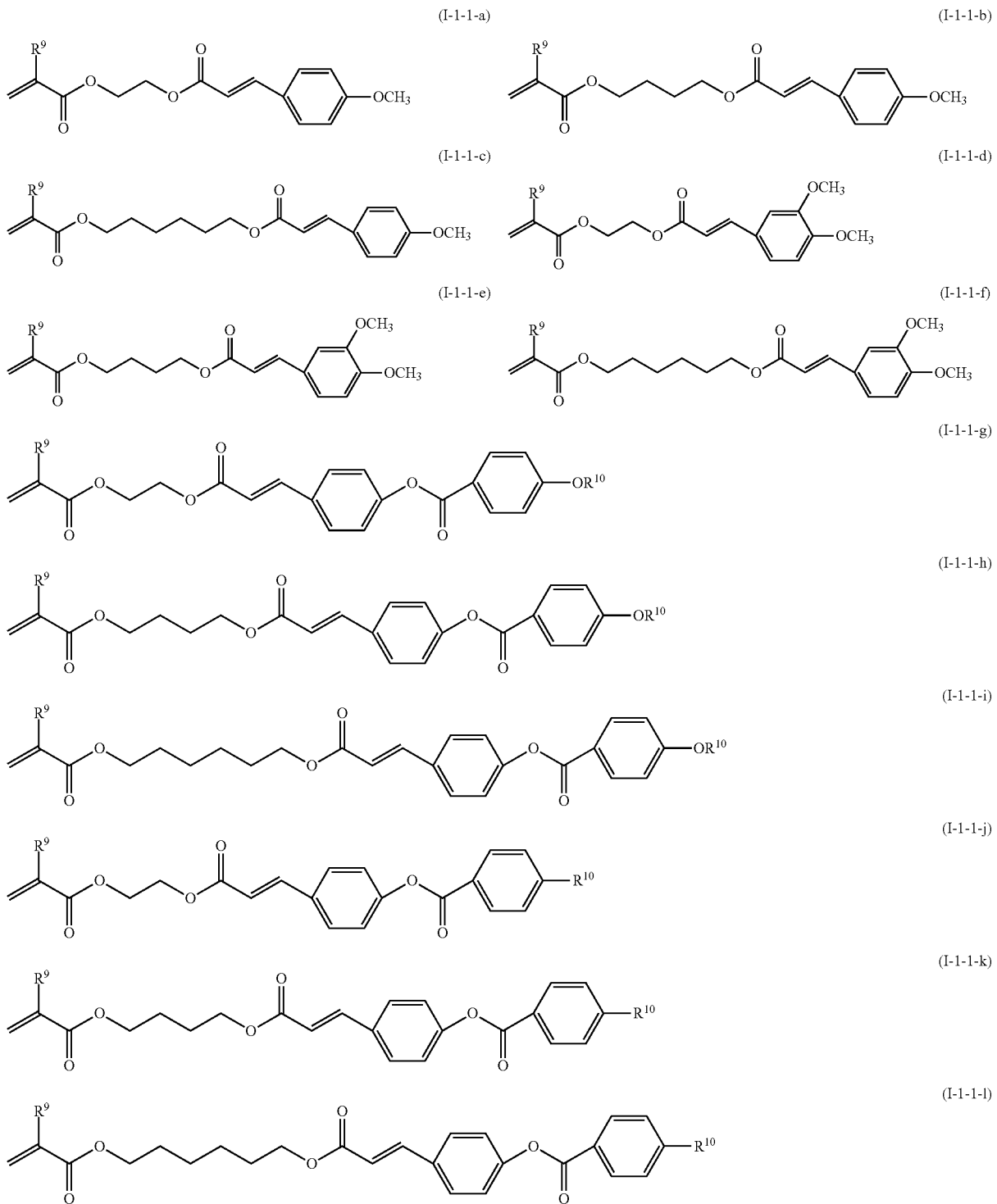
Formula 39
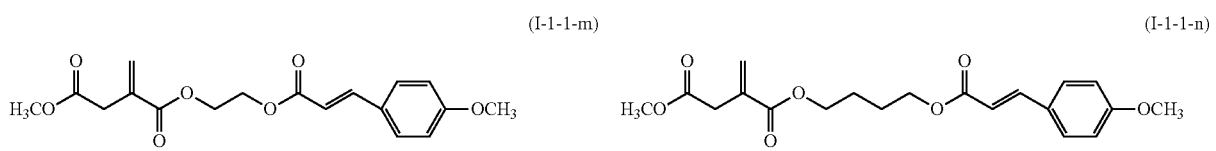

(I-1-1-o)
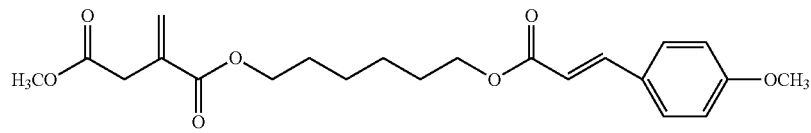
(I-1-1-p) (I-1-1-q)
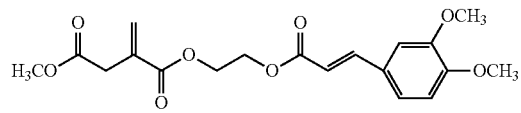 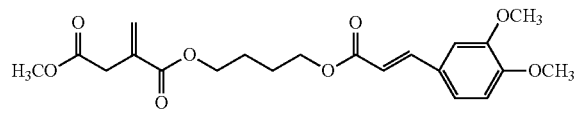
(I-1-1-r)
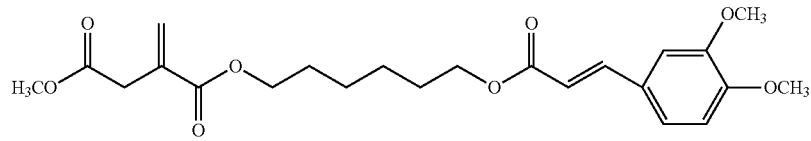
(I-1-1-s)
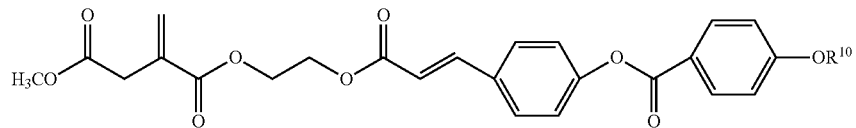
(I-1-1-t)
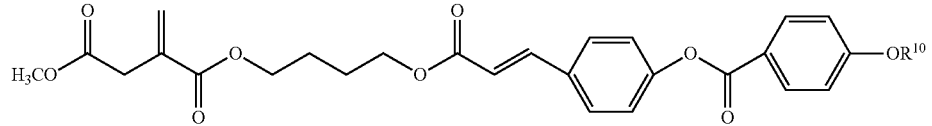
(I-1-1-u)
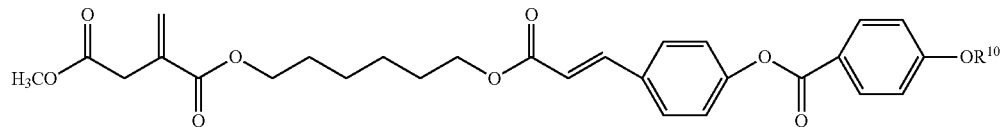
(I-1-1-v)
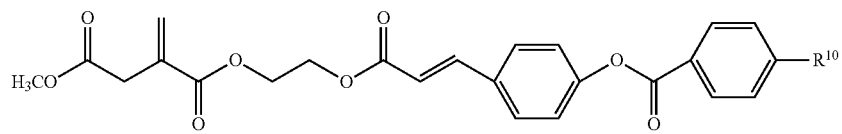
(I-1-1-w)
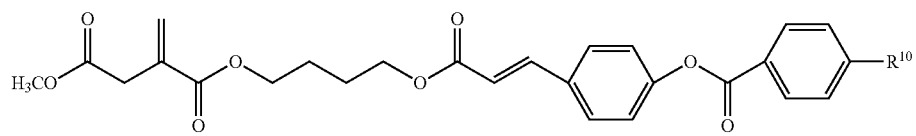
(I-1-1-x)
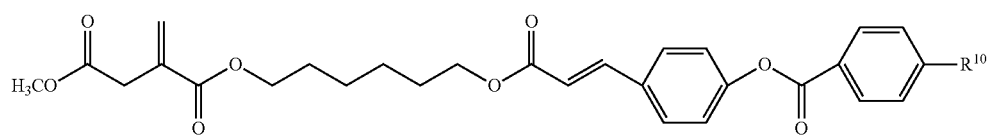
Specific examples of the photoalignable monomer forming the constitutional unit represented by formula (I-2-1) include monomers represented by formulas (I-2-1-a) to (I-2-1-l) and formulas (I-2-1-m) to (I-2-1-x) below (in the formulas, $R^9$ represents hydrogen or a methyl group, and $R^{10}$ represents an alkyl group having 1 to 20 carbons).

Formula 40
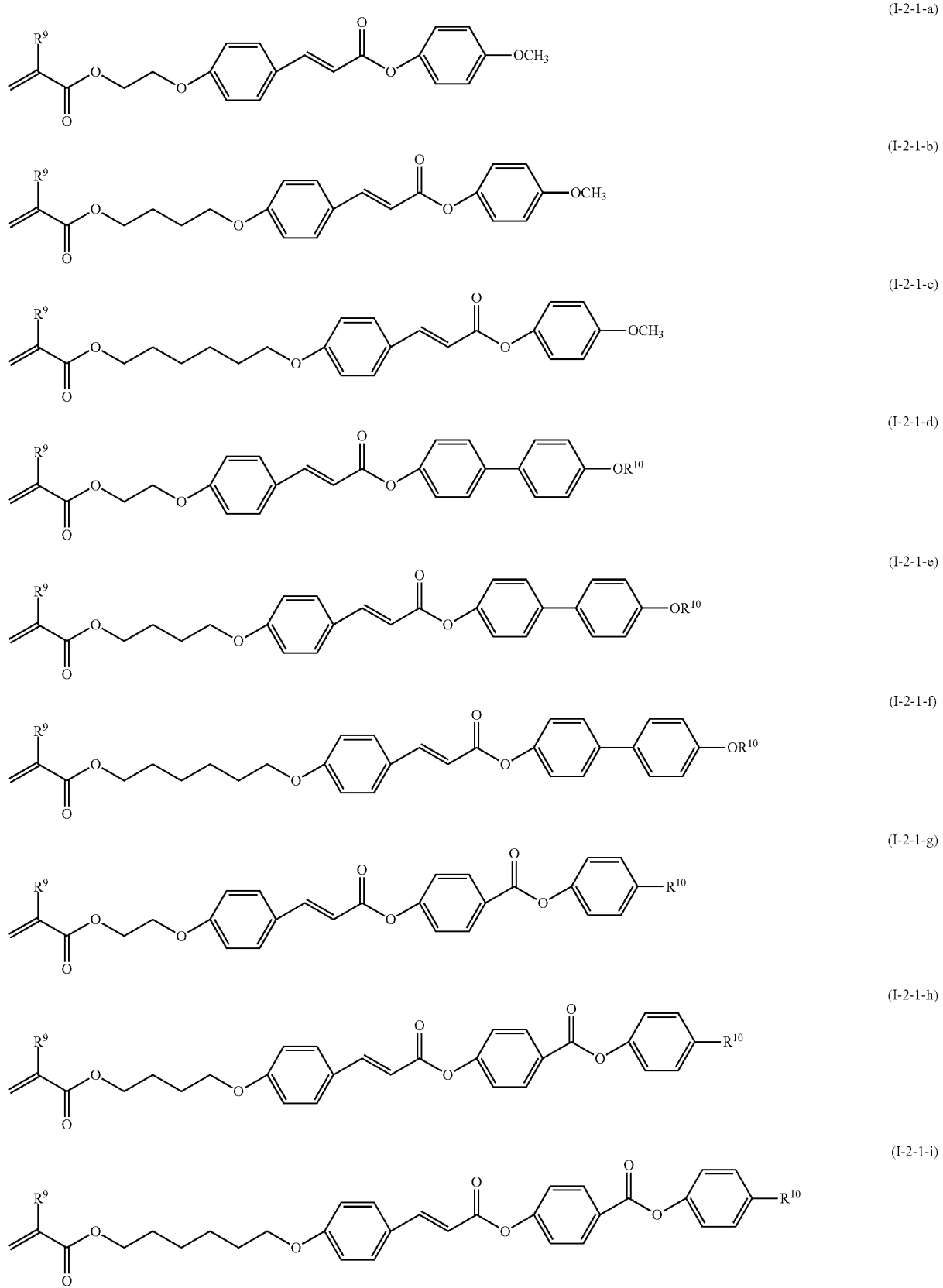

-continued
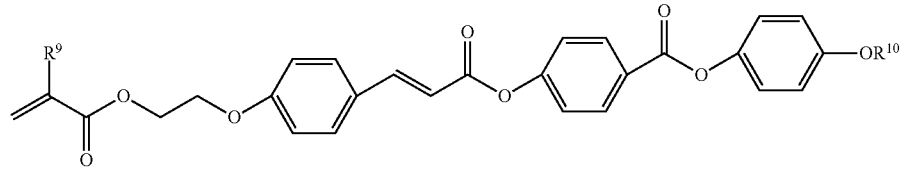
(I-2-1-j)
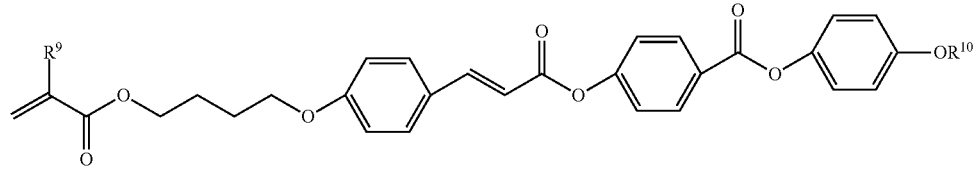
(I-2-1-k)
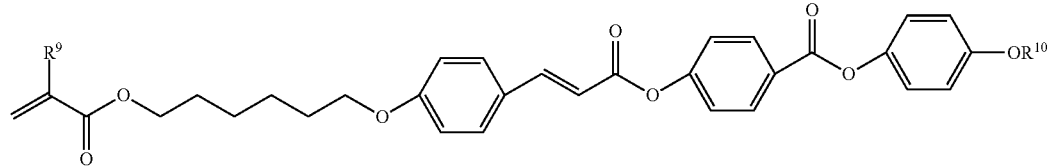
(I-2-1-l)
Formula 41
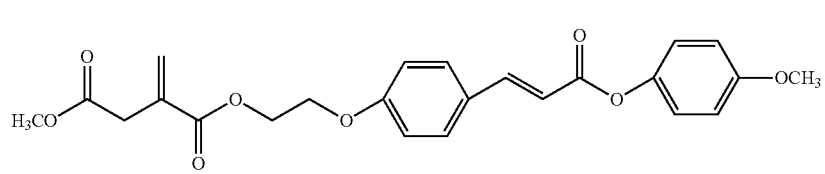
(I-2-1-m)
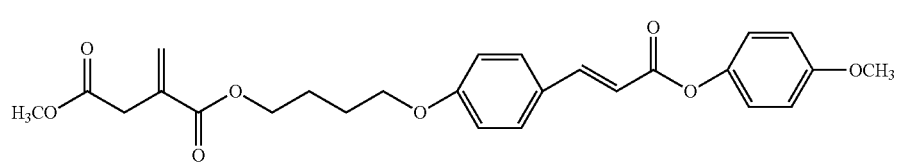
(I-2-1-n)
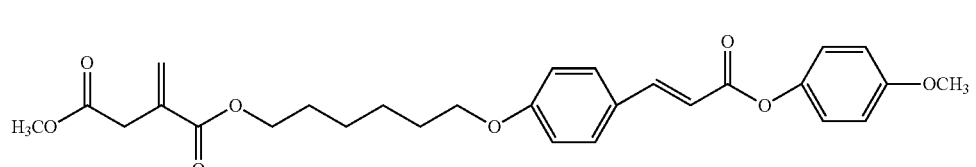
(I-2-1-o)
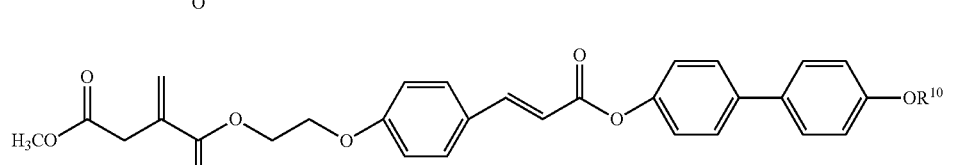
(I-2-1-p)
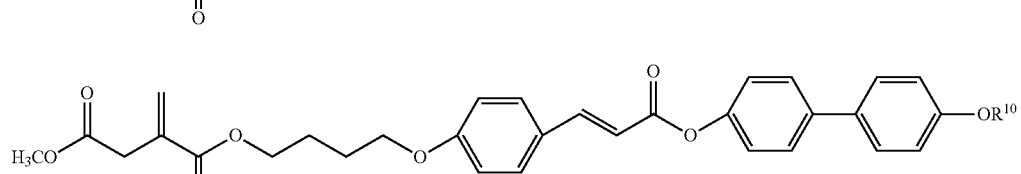
(I-2-1-q)
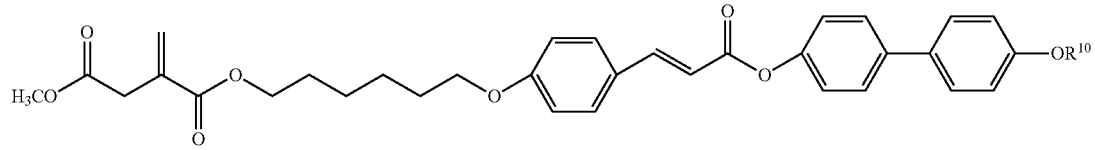
(I-2-1-r)

(I-2-1-s)
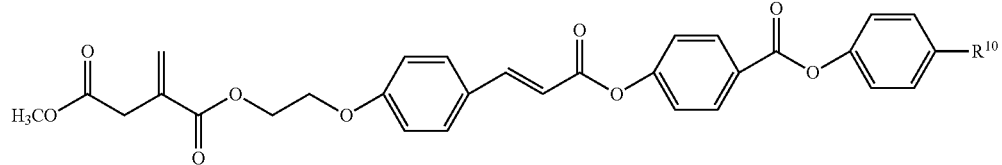
(I-2-1-t)
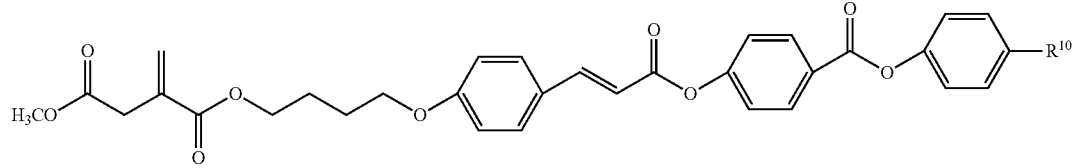
(I-2-1-u)
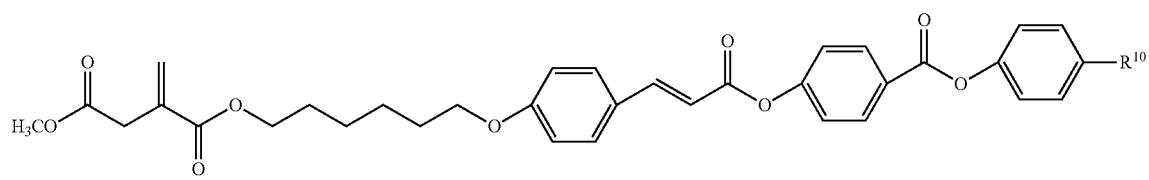
(I-2-1-v)
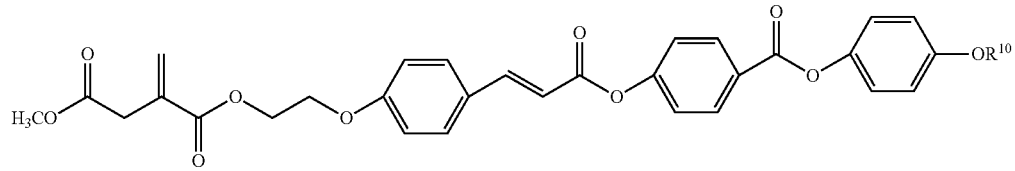
(I-2-1-w)
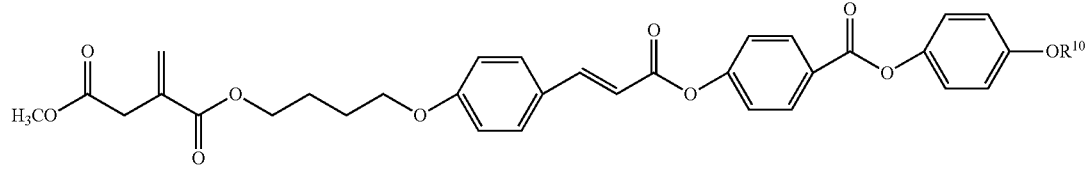
(I-2-1-x)
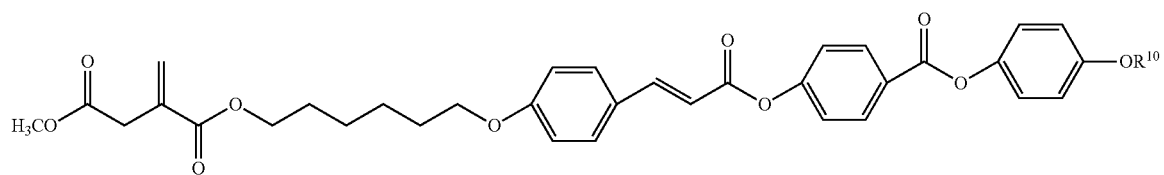
Specific examples of the photoalignable monomer forming the constitutional unit represented by formula (I-3-1) include monomers represented by formulas (I-3-1-a) to (I-3-1-i) and formulas (I-3-1-j) to (I-3-1-r) below (in the formulas, $R^9$ represents hydrogen or a methyl group, and $R^{10}$ represents an alkyl group having 1 to 20 carbons).
Formula 42
(I-3-1-a)
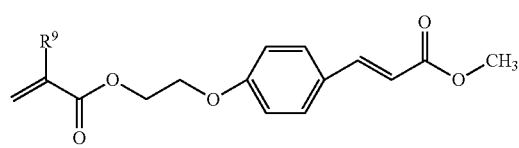
(I-3-1-b)
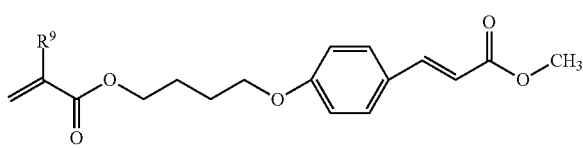

-continued
(I-3-1-c)
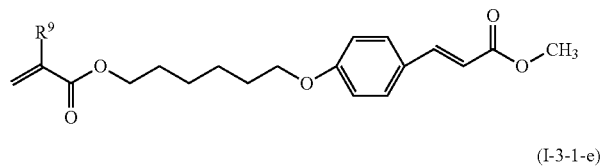
(I-3-1-d)
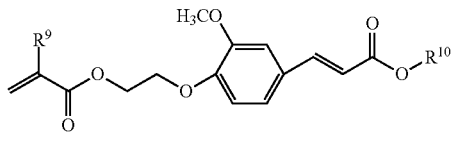
(I-3-1-e)
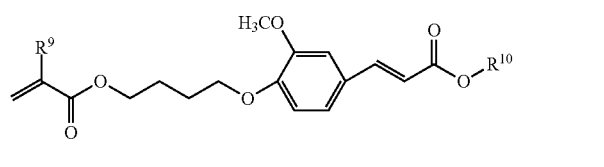
(I-3-1-f)
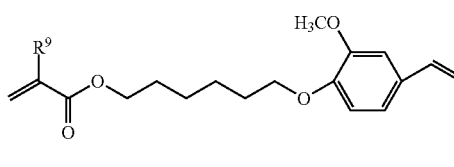
(I-3-1-g)
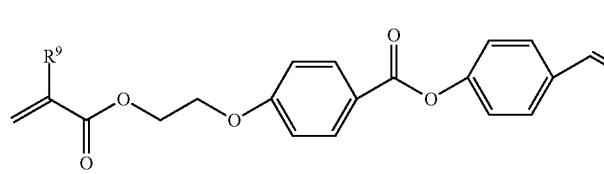
(I-3-1-h)
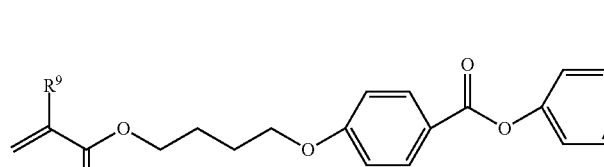
(I-3-1-i)
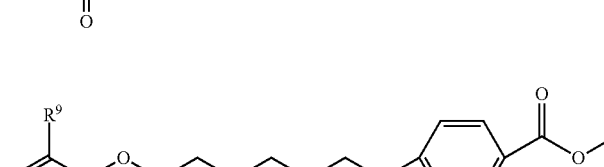
Formula 43
(I-3-1-j)
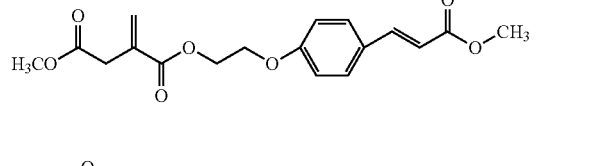
(I-3-1-k)
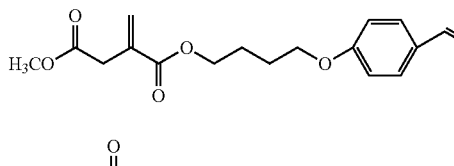
(I-3-1-l)
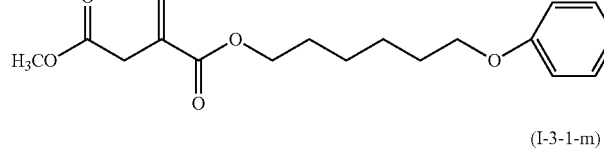
(I-3-1-m)
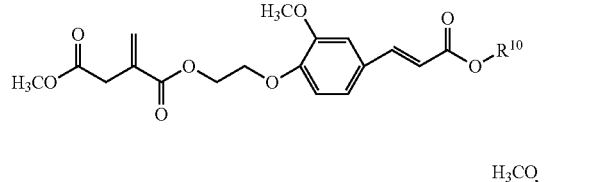
(I-3-1-n)
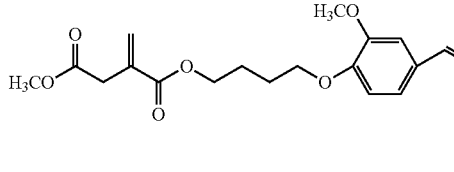
(I-3-1-o)
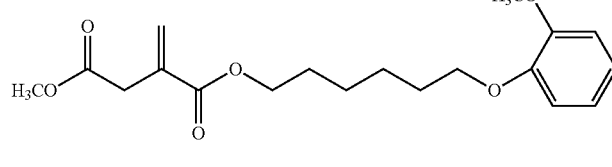

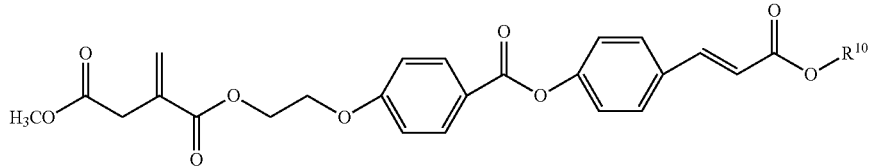
(I-3-1-p)

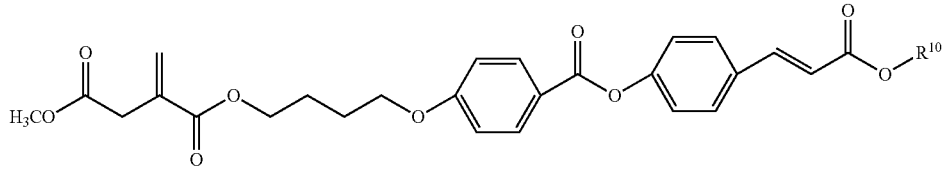
(I-3-1-q)

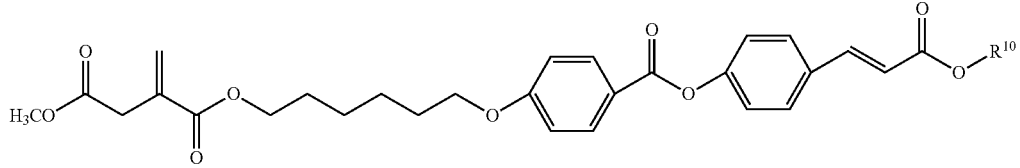
(I-3-1-r)

Among the monomers, a photoalignable monomer forming the constitutional unit represented by formula (I-3-1) described above is preferred, and a photoalignable monomer represented by formula (I-3-1) described above, wherein $R^6$ is a methyl group, and equations: o=2 and p=0 are satisfied, and $R^1$ is a methyl group is further preferred. The photoalignable polymer monomers may be used alone in one kind or in combination with two or more kinds.

The photoalignable polymer forming the first component is characterized by further having at least one polar group selected from a hydroxyl group and a carboxyl group. When the polar groups are included in the photoalignable polymer, adhesion, with the substrate or the like, of the photoalignable polymer composition containing the photoalignable polymer can be improved, and also a reaction with the polymer being the second component as described later is allowed, and thus alignment sensitivity of the photoalignable polymer composition obtained to light is improved. In addition, the hydroxy group includes both an alcoholic hydroxyl group and a phenolic hydroxyl group.

In order to introduce the hydroxyl group or the carboxyl group into the photoalignable polymer, for example, a constitutional unit derived from a monomer having a hydroxyl group or a monomer having a carboxyl group may be included into the photoalignable polymer, and specifically, a monomer mixture containing the photoalignable monomer and a monomer having a hydroxyl group or a monomer having a carboxyl group may be polymerized.

Specific examples of the monomers having the hydroxyl group include hydroxyalkyl(meth)acrylate having a hydroxyalkyl group having 2 to 6 carbons (alcoholic hydroxyl group-containing (meth)acrylate) such as 2-hydroxyethyl(meth)acrylate, 3-hydroxypropyl(meth)acrylate, 4-hydroxybutyl(meth)acrylate, 5-hydroxypentyl(meth)acrylate and 6-hydroxyhexyl(meth)acrylate; and phenolic hydroxyl group-containing (meth)acrylate such as 4-hydroxyphenoxy(meth)acrylate, 2-(4-hydroxyphenoxy)ethyl (meth)acrylate, 3-(4-hydroxyphenoxy)propyl(meth)acrylate, 4-(4-hydroxyphenoxy)butyl(meth)acrylate, 5-(4-hydroxyphenoxy)pentyl(meth)acrylate and 6-(4-hydroxyphenoxy)hexyl(meth)acrylate. Among the monomers having the hydroxyl group, 2-hydroxyethyl (meth)acrylate, 4-hydroxyphenoxy (meth)acrylate or the like is preferred. The monomers having the hydroxyl group may be used alone in one kind or in combination with two or more kinds. In addition, (meth)acrylate herein means a generic term for acrylate and methacrylate, and (meth) acrylate means a generic term for acrylate and methacrylate.

Specific examples of the monomers having the carboxyl group include carboxyl group-containing (meth)acrylate such as ω-carboxypolycaprolactone mono(meth)acrylate, mono hyrdoxyethyl phthalate (meth)acrylate, mono [2-((meth)acryloxy)ethyl]succinate, and mono [2-((meth)acryloxy)ethyl]maleate; carboxyl group-containing itaconate such as methyl itaconate, ethyl itaconate, propyl itaconate, isopropyl itaconate and butyl itaconate; and methacrylic acid and acrylic acid. Among the monomers having the carboxyl group, acrylic acid, methacrylic acid, methyl itaconate or the like is preferred. The monomers having the carboxyl group may be used alone in one kind or in combination with two or more kinds. Moreover, the monomer having the hydroxyl group and the monomer having the carboxyl group may be mixed and used. In addition, (meth)acryloxy herein means a generic term for acryloxy and methacryloxy.

Content of the constitutional unit derived from the monomer having at least one polar group selected from the hydroxyl group and the carboxyl group is ordinarily in the range over approximately 0% by mass, and in the range of approximately 0.01% by mass to approximately 95% by mass, preferably, in the range of approximately 5 to approximately 80% by mass, further preferably, in the range of approximately 10 to approximately 60% by mass, based on the total mass of the photoalignable polymer forming the first component.

The photoalignable polymer being the first component is also characterized by having none of a group that is reactive with at least one polar group selected from the hydroxyl group and the carboxyl group. When the first component includes no such a group that is reactive with the polar group, the first component polymers do not undergo a reaction with each other, and can efficiently react with the second component as described later.

The photoalignable polymer forming the first component preferably includes a polymer including at least one kind of constitutional unit represented by formula (I-1-1) above, and a constitutional unit derived from hydroxyalkyl(meth)acrylate having a hydroxyalkyl group having 2 to 6 carbons, a polymer including at least one kind of constitutional unit represented by formula (I-2-1) above, and a constitutional unit derived from hydroxyalkyl(meth)acrylate having a hydroxyalkyl group having 2 to 6 carbons, and a polymer including at least one kind of constitutional unit represented by formula (I-3-1) above, and a constitutional unit derived from hydroxyalkyl(meth)acrylate having a hydroxyalkyl group having 2 to 6 carbons.

Moreover, the photoalignable polymer forming the first component preferably includes a polymer including at least one kind of constitutional unit represented by formula (I-1-1) above, and a constitutional unit derived from at least one kind of monomer selected from carboxyl group-containing (meth)acrylate, carboxyl group-containing itaconate and phenolic hydroxyl group-containing (meth)acrylate, a polymer including at least one kind of constitutional unit represented by formula (I-2-1) above, and a constitutional unit derived from at least one kind of monomer selected from carboxyl group-containing (meth)acrylate, carboxyl group-containing itaconate and phenolic hydroxyl group-containing (meth)acrylate, and a polymer including at least one kind of constitutional unit represented by formula (I-3-1) above, and a constitutional unit derived from at least one kind of monomer selected from carboxyl group-containing (meth)acrylate, carboxyl group-containing itaconate and phenolic hydroxyl group-containing (meth)acrylate.

The photoalignable polymer forming the first component may include a constitutional unit having a group other than the photoalignable group, the hydroxyl group and the carboxyl group under the conditions without including a group that is reactive with at least one polar group selected from the hydroxyl group and the carboxyl group. In order to incorporate such a constitutional unit into the polymer, for example, a mixture containing the photoalignable monomer and the monomer having the hydroxyl group or the monomer having the carboxyl group, and also containing any other monomer without including the group that is reactive with at least one polar group selected from the hydroxyl group and the carboxyl group may be polymerized.

Specific examples of other monomers described above include alkyl mono(meth)acrylate such as methyl(meth)acrylate, ethyl(meth)acrylate, butyl(meth)acrylate and 2-ethylhexyl(meth)acrylate; aryl mono(meth)acrylate such as phenyl(meth)acrylate and benzyl(meth)acrylate; polyfunctional (meth)acrylate having no hydroxyl group, no carboxyl group and no photoalignable group, such as 1,4-butanediol di(meth)acrylate, 1,6-hexanediol di(meth)acrylate, ethylene glycol di(meth)acrylate, neopentyl glycol di(meth)acrylate, diethylene glycol di(meth)acrylate, triethylene glycol di(meth)acrylate, polyethylene glycol di(meth)acrylate, hydroxypivalate neopentyl glycol di(meth)acrylate, trimethylolpropane tri(meth)acrylate, ethoxylated trimethylolpropane tri(meth)acrylate, ditrimethylolpropane tetra(meth)acrylate, pentaerythritol di(meth)acrylate, pentaerythritol tri(meth)acrylate, pentaerythritol tetra(meth)acrylate, dipentaerythritol penta(meth)acrylate, dipentaerythritol hexa(meth)acrylate, dicyclopentanyl di(meth)acrylate, ethoxylated hydrogenated bisphenol A di(meth)acrylate, ethoxylated bisphenol A di(meth)acrylate, ethoxylated bisphenol F di(meth)acrylate, ethoxylated bisphenol S di(meth)acrylate, hydroxypropyl di(meth)acrylate, diethylene glycol bishydroxypropyl(meth)acrylate, and monohydroxypentaerythritol tri(meth)acrylate, acrylamide, methacrylamide and any other vinyl monomer such as vinyl ether, a styrene derivative and vinyl ester.

Moreover, as any other monomer described above, a commercially available monofunctional monomer or polyfunctional monomer can also be used. Specific examples include 1,6-hexanediol di(meth)acrylate and pentaerythritol tetra(meth)acrylate.

The monomers may be used alone in one kind, or may be used by mixing two or more kinds.

Weight average molecular weight of the polymer forming the first component is not particularly limited, as long as advantageous effects of the invention are produced, but preferably, approximately 500,000 or less, further preferably, approximately 200,000 or less, preferably, approximately 1,000 or more, further preferably, approximately 5,000 or more. The weight average molecular weight of the polymer of the invention is expressed in terms of a value determined as a relative value to a standard reference material (standard polystyrene) according to a gel permeation chromatograph (GPC).

The photoalignable polymer being the first component may be a homopolymer of one kind or a mixture of polymers of two or more different kinds.

The polymer contained as the second component is characterized by having the group that is reactive with at least one polar group selected from the hydroxyl group and the carboxyl group.

Alignment sensitivity of the photoalignable polymer (a polymer including a group having a cinnamic acid skeleton, for example) being the first component is easily affected by a structure of the monomer forming the photoalignable polymer, or a concentration of the photoalignable group, and also various conditions such as conditions upon coating the polymer as a photoalignment film (a film thickness, a baking temperature or a solvent contained in the composition upon coating the polymer). Then, when the alignment sensitivity decreases, an exposure amount (time) required for photoalignment in a manufacture step increases to decrease production efficiency. In a case of the photoalignable polymer composition of the invention, although a detailed mechanism is unknown, at least one kind of polar group selected from the hydroxyl group and the carboxyl group included in the first component interacts (typically reacts) with the group that is included in the second component and is reactive with the polar group, and thus the alignment sensitivity can be presumably increased by an effect of shortening a distance between adjacent photoalignable groups (distance between double bond parts relating to photodimerization in a case where the group having the cinnamic acid skeleton performs a photodimerization reaction, for example). Therefore, even without changing the structure or the content of the photoalignable group included in the photoalignable polymer composition, coating conditions, or the like, a photoalignment film having a high sensitivity to light can be presumably prepared. Moreover, when the second component is contained in addition to the first component, an improvement is allowed in adhesion of the photoalignment film prepared from the polymer composition with the substrate or the polymerizable liquid crystal film.

Specific examples of the group that is reactive with the polar group include an alkoxysilane group, an isocyanate group, a [1-methylpropylideneamino]carboxyamino group, a (3,5-dimethylpyrazolyl) carbonylamino group and an epoxy group.

One example of the group including the alkoxysilane group includes a group represented by formula (II-1) below.

Formula 44

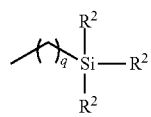

(II-1)

In the formula, $R^2$ each independently represents hydrogen, an alkyl group having 1 to 4 carbons or an alkoxy group having 1 to 4 carbons, and at least one of $R^2$ is an alkoxy group having 1 to 4 carbons. The alkoxy group having 1 to 4 carbons preferably includes a methoxy group and an ethoxy group. $R^2$ described above preferably includes hydrogen, a methyl group, a methoxy group and an ethoxy group. In the formula, q represents an integer from 0 to 10, preferably, 2 or 3.

One example of the group including the isocyanate group includes a group represented by formula (II-2) below.

Formula 45

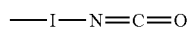

(II-2)

In the formula, L represents —CH$_2$CH$_2$— or —CH$_2$CH$_2$OCH$_2$CH$_2$—.

One example of the group including the [1-methylpropylideneamino]carboxyamino group includes groups represented by formulas (II-3) and (II-3-1-1) below.

Formula 46

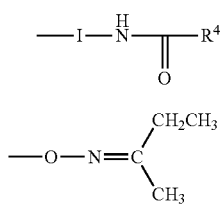

(II-3)

(II-3-1-1)

In the formula, L represents —CH$_2$CH$_2$— or —CH$_2$CH$_2$OCH$_2$CH$_2$—, and $R^4$ represents a group represented by formula (II-3-1-1) above.

One example of the group including (3,5-dimethylpyrazolyl)carbonylamino group includes groups represented by formulas (II-3) and (II-3-1-2) below.

Formula 47

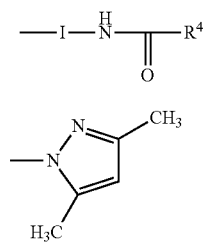

(II-3)

(II-3-1-2)

In the formula, L represents —CH$_2$CH$_2$— or —CH$_2$CH$_2$OCH$_2$CH$_2$—, and $R^4$ represents a group represented by formula (II-3-1-2) above.

The epoxy group includes an oxirane and an oxetane. One example of the oxirane includes groups represented by formulas (II-4) and (II-4-1-1) below, and groups represented by formulas (II-4) and (II-4-1-2) below.

Formula 48

—T—S (II-4)

(II-4-1-1)

(II-4-1-2)

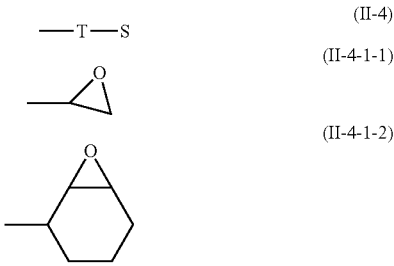

In the formulas, T represents a methylene group having 1 to 20 carbons in which oxygen may be substituted for arbitrary carbon (however, oxygen is not substituted for adjacent carbons simultaneously), and S represents a group represented by formula (II-4-1-1) or (II-4-1-2).

One example of the group including the oxetane includes groups represented by formulas (II-4) and (II-4-1-3) below.

Formula 49

—T—S (II-4)

(II-4-1-3)

In the formulas, T represents a methylene group having 1 to 20 carbons in which oxygen may be substituted for arbitrary carbon (however, oxygen is not substituted for adjacent carbons simultaneously), S represents a group represented by formula (II-4-1-3), and $R^5$ represents a methyl group or an ethyl group.

Among the groups, when reactivity with the hydroxyl group or the carboxyl group included in the first component is taken into consideration, an alkoxysilane group, an isocyanate group, a [1-methylpropylideneamino]carboxyamino group or a (3,5-dimethylpyrazolyl)carbonylamino group is preferred, and an alkoxy group or an isocyanate group is further preferred.

When the polar group included in the photoalignable polymer of the first component is an alcoholic hydroxyl group, among the groups, an alkoxysilane group, an isocyanate group, a [1-methylpropylideneamino]carboxyamino group or a (3,5-dimethylpyrazolyl)carbonylamino group is preferred. Moreover, when the polar group included in the photoalignable polymer of the first component is a carboxyl group or a phenolic hydroxyl group, among the groups, an alkoxy silane group or an epoxy group is preferred. Among the groups, when reactivity with the polar group included in the first component is taken into consideration, an alkoxysilane group, an isocyanate group, a [1-methylpropylideneamino]carboxyamino group or a (3,5-dimethylpyrazolyl)carbonylamino group is preferred. The groups that are reactive with the polar group may be contained alone in one kind or in two or more kinds in the polymer of the second component.

In order to introduce the group that is reactive with at least one polar group selected from the hydroxyl group and the carboxyl group into the polymer of the second component, for example, the constitutional unit derived from the monomer including the group that is reactive with the polar group may be incorporated into the photoalignable polymer, and specifically, a monomer mixture containing the monomer including the group that is reactive with the polar group may be polymerized.

Specific examples of the constitutional units derived from the monomer having the alkoxysilane group include at least one kind of constitutional unit represented by formula (II-1-1) below.

Formula 50

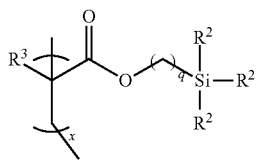

(II-1-1)

In the formula, a parenthesized moiety subscribed with x represents a moiety to be included in the polymer main chain, and x represents a mole fraction (x≤1) of the constitutional unit included in the polymer of the second component. In the formula, $R^3$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, preferably, a methyl group. In the formula, $R^2$ each independently represents hydrogen, an alkyl group having 1 to 4 carbons, or an alkoxy group having 1 to 4 carbons, and at least one of $R^2$ is an alkoxy group having 1 to 4 carbons. In the formula, two or more of $R^2$ preferably represent a methoxy group. In the formula, q represents an integer from 0 to 10, preferably, represents 3.

The mole fraction x is preferably approximately 0.7 or less, further preferably, approximately 0.5 or less, still further preferably, approximately 0.3 or less. The mole fraction x is preferably approximately 0.01 or more, further preferably, approximately 0.1 or more.

Specific examples of the monomers forming the constitutional unit represented by formula (II-1-1) above include monomers represented by formulas (II-1-1a) to (II-1-1j) below.

Formula 51

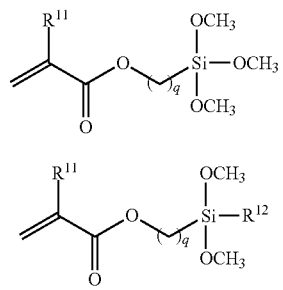

(II-1-1-a)

(II-1-1-b)

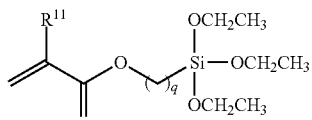

(II-1-1-c)

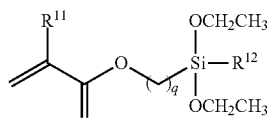

(II-1-1-d)

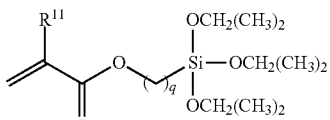

(II-1-1-e)

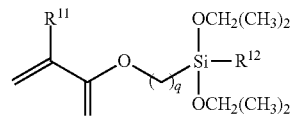

(II-1-1-f)

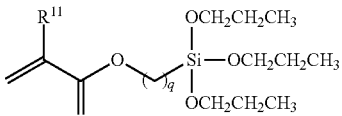

(II-1-1-g)

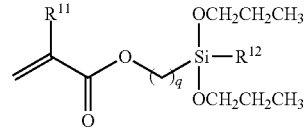

(II-1-1-h)

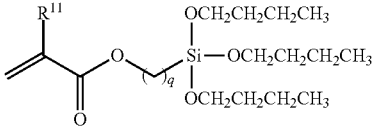

(II-1-1-i)

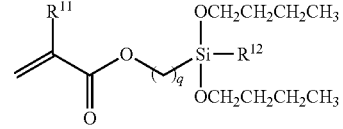

(II-1-1-j)

In the formulas, $R^{11}$ represents hydrogen or a methyl group, preferably, a methyl group. In the formulas, $R^{12}$ represents hydrogen or an alkyl group having 1 to 4 carbons, preferably, a methyl group. In the formulas, q represents an integer from 0 to 10, preferably, 3. The monomers having the alkoxysilane group may be used alone in one kind, or may be used by mixing two or more kinds.

Specific examples of the constitutional units derived from the monomer having the isocyanate group includes at least one of constitutional unit represented by formula (II-2-1) below. Specific examples of the constitutional units derived from the monomer having the [1-methylpropylideneamino] carboxyamino group include at least one of constitutional units represented by formulas as described below or formula (II-3-1) and formula (II-3-1-1) below. Specific examples of the constitutional units derived from the monomer having the (3,5-dimethylpyrazolyl)carbonylamino group include at least one of constitutional units represented by formula (II-3-1) and formula (II-3-1-2) below.

Formula 52

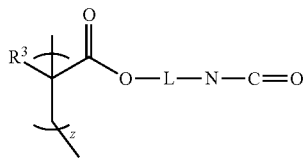
(II-2-1)

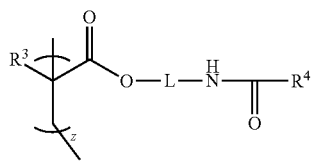
(II-3-1)

In the formulas, a parenthesized moiety subscribed with z represents a moiety to be included in the polymer main chain, and z represents a mole fraction (z≤1) of the constitutional unit included in the polymer of the second component. In the formulas, $R^3$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine, L represents —CH$_2$CH$_2$— or —CH$_2$CH$_2$OCH$_2$CH$_2$—, and $R^4$ represents a group represented by formula (II-3-1-1) or (II-3-1-2) below.

Formula 53

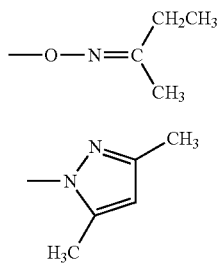
(II-3-1-1)

(II-3-1-2)

The mole fraction z is preferably approximately 0.7 or less, further preferably, approximately 0.5 or less, still further preferably, approximately 0.3 or less. The mole fraction z is preferably approximately 0.01 or more, further preferably, approximately 0.1 or more.

The monomer having the isocyanate group, the monomer having the [1-methylpropylideneamino]carboxyamino group, and the monomer having the (3,5-dimethylpyrazolyl) carbonylamino group may be used alone in one kind, or may be used by mixing two or more kinds.

Specific examples of the constitutional units derived from the monomer having the epoxy group includes at least one of constitutional unit represented by formula (II-4-1) and formula (II-4-1-1) below, or formula (II-4-1-2) below. Moreover, specific examples of the constitutional units derived from the monomer having the oxetane group include at least one of constitutional unit represented by formula (II-4-1) and (II-4-1-3) below, respectively.

Formula 54

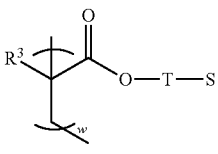
(II-4-1)

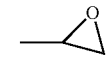
(II-4-1-1)

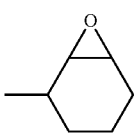
(II-4-1-2)

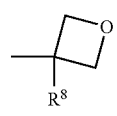
(II-4-1-3)

In the formulas, a parenthesized moiety subscribed with w represents a moiety to be included in the polymer main chain, and w represents a mole fraction 1) of the constitutional unit included in the polymer of the second component. $R^3$ represents hydrogen, an alkyl group having 1 to 20 carbons in which arbitrary hydrogen may be replaced by fluorine or an alkoxy group having 1 to 20 carbons in which arbitrary hydrogen may be replaced by fluorine. T represents a methylene group having 1 to 20 carbons in which oxygen may be substituted for arbitrary carbon (however, oxygen is not substituted for adjacent carbons simultaneously). S represents a group represented by formula (II-4-1-1), (II-4-1-2) or (II-4-1-3), and $R^8$ represents a methyl group or an ethyl group.

The mole fraction w is preferably approximately 0.7 or less, further preferably, approximately 0.5 or less, still further preferably, approximately 0.3 or less. The mole fraction w preferably is approximately 0.01 or more, further preferably, approximately 0.1 or more.

The monomers having the monomer including the epoxy group may be used alone in one kind, or may be used by mixing two or more kinds.

Content of the constitutional unit derived from the monomer including the group that is reactive with at least one polar group selected from the hydroxyl group and the carboxyl group (typically, the constitutional unit represented by the formulas (I-1-1), (I-2-1) and (I-3-1)) is ordinarily in the range of approximately 5% by mass to approximately 99.99% by mass, preferably, in the range of approximately 20 to approximately 95% by mass, further preferably, in the range of approximately 30 to approximately 90% by mass, based on the total mass of the polymer being the second component. When the content of the group that is reactive with the polar group is too large, alignment sensitivity of the photoalignment film prepared from the photoalignable polymer composition, wettability of the film, or the like may occasionally decrease.

According to one preferred embodiment, the photoalignable group is included in the polymer being the second component. When the photoalignable group is included in the polymer being the second component, sensitivity of the photoalignable group to light in the photoisomerization reaction, the photodimerization reaction or the like tends to be further improved. Although the detailed mechanism is unknown, the photoalignable group included in the first component and the photoalignable group included in the second component are presumed to forma positional relationship in which sensitivity of the photoalignable group to light in the photoisomerization reaction, the photodimerization reaction or the like is further improved.

Specific examples of the photoalignable groups include groups represented by formulas (I-1) to (I-3) above as exemplified as the first component above, and among the groups, a group represented by formula (I-3) is preferred. In order to introduce into the groups represented by formulas (I-1) to (I-3) into the polymer forming the second component, for example, a photoalignable monomer forming the constitutional unit represented by formulas (I-1-1), (I-2-1) and (I-3-1) above may be incorporated into the monomer mixture forming the second component above. The photoalignable monomers may be used alone in one kind, or may be used by mixing two or more kinds.

Content of the constitutional unit derived from the monomer having the photoalignable group (typically, the constitutional unit represented by the formulas (I-1-1), (I-2-1) and (I-3-1)) is preferably in the range of approximately 0.01 to approximately 50% by mass, further preferably, in the range of approximately 0.1 to approximately 30% by mass, based on the total mass of the polymer forming the second component.

The polymer forming the second component may include a constitutional unit derived from any other monomer. In order to introduce such a constitutional unit into the polymer forming the second component, any other monomer may be incorporated into the monomer mixture forming the second component. Specific examples of other monomers that can be contained in the second component include other monomers exemplified in the first component, such as alkyl mono(meth)acrylate, aryl mono(meth)acrylate, polyfunctional (meth)acrylate having no hydroxyl group, no carboxyl group and no photoalignable group, acrylamide, methacrylamide, and any other vinyl monomer such as vinyl ether, a styrene derivative and vinyl ester. Other monomers as described above may be used alone in one kind, or may be used by mixing two or more kinds.

In addition, any other monomer may be further contained in the monomer mixture forming the second component within the range in which advantageous effects of the invention are not adversely affected.

Weight average molecular weight of the polymer forming the second component is not particularly limited, as long as advantageous effects of the invention are produced, but preferably, approximately 500,000 or less, further preferably, approximately 200,000 or less, still further preferably, approximately 100,000 or less, preferably, approximately 1,000 or more, further preferably, approximately 5,000 or more.

The photoalignable polymer being the second component may be a homopolymer of one kind or a mixture of polymers of two or more different kinds.

When the first component is a polymer including at least one of constitutional unit selected from formulas (I-1-1), (I-2-1) and (I-3-1) above, and a constitutional unit derived from hydroxyalkyl (meth)acrylate having a hydroxyalkyl group having 2 to 6 carbons, the second component preferably includes a polymer including a constitutional unit represented by formulas (II-1-1), (II-2-1) and (II-3-1) above.

When the first component is a polymer including at least one of constitutional unit selected from formula (I-1-1), (I-2-1) and (I-3-1) above, and a constitutional unit derived from at least one kind of monomer selected from carboxyl group-containing (meth)acrylate, carboxyl group-containing itaconate and phenolic hydroxyl group-containing (meth) acrylate, the second component is preferably a polymer including at least one of constitutional unit selected from formulas (II-1-1) and (II-4-1), further preferably, a polymer including a constitutional unit represented by formula (II-1-1) above.

An amount of blending the first component and the second component is not particularly limited, as long as advantageous effects of the invention are produced, but ordinarily, a ratio of the first component is in the range of approximately 50.00 to approximately 99.99% by mass, and a ratio of the second component is in the range of approximately 0.01 to approximately 50.00% by mass, further preferably, a ratio of the first component is in the range of approximately 70.0 to approximately 99.50% by mass, and a ratio of the second component is in the range of approximately 0.50 to approximately 30.00% by mass, based on the total mass of the first component and the second component.

A method for manufacturing the polymers forming the first component and the second component is not particularly limited, but can be manufactured by an ordinary method that is industrially applied. For example, the polymers can be manufactured by performing cationic polymerization, radical polymerization, anionic polymerization or the like of the monomer mixture forming the first component or the second component. Among the polymerization methods, radical polymerization is preferred from a viewpoint of ease of reaction control.

As a polymerization initiator for the radical polymerization, various kinds of polymerization initiators such as a thermal radical polymerization initiator and a photoradical polymerization initiator can be used.

The thermal radical polymerization initiator generates a radical by heating the initiator at a decomposition temperature or higher. Specific examples of the thermal radical polymerization initiators include ketone peroxides (methyl ethyl ketone peroxide and cyclohexanon peroxide), diacyl peroxides (acetyl peroxide and benzoyl peroxide), hydroperoxides (hydrogen peroxide, tert-butyl hydroperoxide and cumene hydroperoxide), dialkyl peroxides (di-tert-butyl peroxide, dicumyl peroxide and dilauroyl peroxide), peroxyketals (dibutylperoxycyclohexane), alkyl peresters (tert-butyl peroxyneodecanoate, tert-butyl peroxypivalate and tert-amyl peroxy-2-ethylcyclohexanoate), persulfates (potassium persulfate, sodium persulfate and ammonium persulfate) and an azo compound (azobisisobutyronitril, dimethyl 2,2'-azobisisobutyrate and 2,2'-di(2-hydroxyethyl)azobisisobutyronitril). The thermal radical polymerization initiators can be used alone in one kind or in combination with two or more kinds.

The photoradical polymerization initiator generates a radical by irradiation with light. Specific examples of the photoradical polymerization initiators include benzophenone, Michler's ketone, 4,4'-bis(diethylamino)benzophenone, xanthone, thioxanthone, isopropyl xanthone, 2,4-diethyl thioxanthone, 2-ethylanthraquinone, acetophenone, 2-hydroxy-2-methylpropiophenone, 2-hydroxy-2-methyl-4'-isopropylpropiophenone, 1-hydroxycyclohexyl phenyl ketone, isopropyl benzoin ether, isobutyl benzoin ether, 2,2-diethoxyacetophenone, 2,2-dimethoxy-2-phenylacetophenone, camphorquinone, benzanthrone, 2-methyl-1-[4-(methylthio)phenyl]-2-morpholinopropane-1-one, ethyl 2-benzyl-2-dimethylamino-1-(4-morpholinophenyl)-butanone-1,4-dimethylaminobenzoate, isoamyl-dimethylaminobenzoate, 4,4'-di(t-butylperoxycarbonyl)benzophenone, 3,4,4'-tri(t-butylperoxycarbonyl)benzophenone, 2,4,6-trimethylbenzoyldiphenylphosphine oxide, 2-(4'-methoxystyryl)-4,6-bis(trichloromethyl)-s-triazine, 2-(3',4'-dimethoxystyryl)-4,6-bis(trichloromethyl)-s-triazine, 2-(2',4'-dimethoxystyryl)-4,6-bis(trichloromethyl)-s-triazine, 2-(2'-methoxystyryl)-4,6-bis(trichloromethyl)-s-triazine, 2-(4'-pentyloxystyryl)-4,6-bis(trichloromethyl)-s-triazine, 4-[p-N,N-di(ethoxycarbonylmethyl)]-2,6-di(trichloromethyl)-s-triazine, 1,3-bis(trichloromethyl)-5-(2'-chlorophenyl)-s-triazine, 1,3-bis(trichloromethyl)-5-(4'-methoxyphenyl)-s-triazine, 2-(p-dimethylaminostyryl)benzoxazole, 2-(p-dimethylaminostyryl)benzthiazole, 2-mercaptobenzothiazole, 3,3'-carbonylbis(7-diethylaminocoumarin), 2-(o-chlorophenyl)-4,4',5,5'-tetraphenyl-1,2'-biimidazole, 2,2'-bis(2-chlorophenyl)-4,4',5,5'-tetrakis(4-ethoxycarbonylphenyl)-1,2'-biimidazole, 2,2'-bis(2,4-dichlorophenyl)-4,4',5,5'-tetraphenyl-1,2'-biimidazole, 2,2'-bis(2,4-dibromophenyl)-4,4',5,5'-tetraphenyl-1,2'-biimidazole, 2,2'-bis(2,4,6-trichlorophenyl)-4,4',5,5'-tetraphenyl-1,2'-biimidazole, 3-(2-methyl-2-dimethylaminopropionyl)carbazole, 3,6-bis(2-methyl-2-morpholinopropionyl)-9-n-dodecylcarbazole, 1-hydroxycyclohexyl phenyl ketone, bis(η5-2,4-cyclopentadiene-1-yl)-bis(2,6-difluoro-3-(1H-pyrrole-1-yl)-phenyl) titanium, 3,3',4,4'-tetra(t-butylperoxycarbonyl)benzophenone, 3,3',4,4'-tetra(t-hexylperoxycarbonyl)benzophenone, 3,3'-di(methoxycarbonyl)-4,4'-di(t-butylperoxycarbonyl)benzophenone, 3,4'-di(methoxycarbonyl)-4,3'-di(t-butylperoxycarbonyl)benzophenone, 4,4'-di(methoxycarbonyl)-3,3'-di(t-butylperoxycarbonyl)benzophenone, 2-(3-methyl-3H-benzothiazole-2-ylidene)-1-naphthalene-2-yl-ethanone or 2-(3-methyl-1,3-benzothiazole-2(3H)-ylidene)-1-(2-benzoyl)ethanone. The photopolymerization initiators can be used alone or in combination with two or more kinds.

A form of the radical polymerization is not particularly limited. The radical polymerization can be performed in various kinds of forms such as emulsion polymerization, suspension polymerization, dispersion polymerization, precipitation polymerization, bulk polymerization and solution polymerization. In addition, with regard to a form of polymerization, polymerization methods in the cationic polymerization, the anionic polymerization or the like can also be applied in various kinds of forms in a similar manner. Other forms are described, for example, in "Synthesis of Polymers (First Volume) (Kobunshi no Gosei (Jyo) in Japanese), (edited by Takeshi Endo, Kodansha Ltd., issued in 2010).

Hereinafter, general solution polymerization as one of the forms of radical polymerization will be explained. The solution polymerization is a polymerization form in which polymerization is ordinarily performed in a solvent using a polymerization catalyst dissolvable in the solvent. The solvent in the solution polymerization can be appropriately selected according to a monomer or the like to be used. An organic solvent ordinarily includes an organic compound having a boiling point under atmospheric pressure within the range of approximately 50 to approximately 200° C., preferably, an organic compound to uniformly dissolve the monomer, and components or the like produced during a polymerization process.

The solvent used in the radical polymerization is not particularly limited, if the solvent does not adversely affect the radical polymerization. Specific examples include:
an aromatic compound such as benzene, toluene, xylene and ethylbenzene; an aliphatic compound such as pentane, hexane, heptane, octane, cyclohexane and cycloheptane; alcohol such as methanol, ethanol, 1-propanol, 2-propanol and ethylene glycol;
ether such as dibutyl ether, ethylene glycol monomethyl ether, ethylene glycol dimethyl ether, tetrahydrofuran and dioxane;
ketone such as acetone, methyl ethyl ketone, methyl isobutyl ketone, cyclohexanone and cyclopentanone;
ester such as ethyl acetate, butyl acetate, amyl acetate and γ-butyrolactone;
a glycol solvent such as ethylene glycol, diethylene glycol, triethylene glycol and propylene glycol; and
a glycol ether solvent such as diethylene glycol monomethyl ether, triethylene glycol monomethyl ether, propylene glycol monomethyl ether, 1-methoxy-2-propanol and 3-methoxy-3-methyl-1-butanol. In addition, the organic solvents can be used alone in one kind or in combination with two or more kinds.

From a viewpoint of control of molecular weight, control of molecular weight distribution, polymerization acceleration or the like with regard to the polymer of the first component and the second component, a chain transfer agent may be used upon performing the radical polymerization. When the chain transfer agent is used, a polymer having a more uniform molecular weight distribution in a preferred molecular weight range can be obtained.

Specific examples of the chain transfer agents include: mercaptans such as β-mercaptopropionic acid, methyl β-mercaptopropionate, isopropylmercaptan, octylmercaptan, decylmercaptan, dodecylmercaptan, tert-dodecylmercaptan, octadecylmercaptan, thiophenol, p-nonylthiophenol, thiosalicylic acid, mercaptoacetic acid and mercapto; alkyl halide such as carbon tetrachloride, chloroform, butyl chloride, 1,1,1-trichloroethane and 1,1,1-tribromooctane; and low-activity monomers such as α-methylstyrene and α-methylstyrene dimer. The amount of use of the chain transfer agents can be appropriately set up depending on activity of the chain transfer agent, a combination with a monomer, a solvent, a polymerization temperature or the like, but is ordinarily in the range of approximately 0.01 mol % to approximately 50 mol % based on the total number of moles of monomers to be used.

Polymerization conditions upon performing the solution polymerization are not particularly limited, either. The polymerization can be performed, for example, within a temperature range of approximately 50 to approximately 200° C. for approximately 10 minutes to approximately 20 hours. From a viewpoint of avoiding deactivation of radicals, the polymerization is preferably performed under an atmosphere of an inert gas such as nitrogen.

In order to accelerate a reaction between the group that is included in the first component or the second component and is reactive with the polar group (hydroxyl group, carboxyl group) and the polar group thereof, the photoalignable polymer composition of the invention may further contain at least one kind selected from an acid compound, a thermal acid generator and a photoacid generator. In addition, the thermal acid generator means a compound that generates acid by heating ordinarily at approximately 60° C. or higher, and the photoacid generator means a compound that generates acid by irradiation with light. Moreover, the thermal acid generator also includes a compound that generates acid by irradiation with light.

Specific examples of the acid compounds include inorganic acid such as phosphoric acid and hydrochloric acid; sulfonic acid such as p-phenolsulfonic acid, p-toluenesulfonic acid, trifluoromethanesulfonic acid, pyridinium-p-toluenesulfonic acid, camphorsulfonic acid, 5-sulfosalicylic acid, 4-chlorobenzenesulfonic acid, 4-hydroxybenzenesulfonic acid, benzenedisulfonic acid, phthalenesulfonic acid and pyridinium-1-naphthalenesulfonic acid, and organic acid such as formic acid. The acid compounds may be used alone in one kind or in combination with two or more kinds.

Specific examples of the thermal acid generators include 4-acetoxyphenyldimethylsulfonium hexafluoroarsenate, benzyl-4-hydroxyphenylmethylsulfonium hexafluoroantimonate, 4-acetoxyphenylbenzylmethylsulfonium hexafluoroantimonate, dibenzyl-4-hydroxyphenylsulfonium hexafluoroantimonate, 4-acetoxyphenylbenzylsulfonium hexafluoroantimonate, 3-benzylbenzothiazolium hexafluoroantimonate, 2,4,4,6-tetrabromocyclohexadienone, benzene tosylate and 2-nitrobenzyl tosylate. The heat acid generators may be used alone in one kind or in combination with two or more kinds.

Specific examples of the photoacid generators include p-(phenylthio)phenyldiphenylsulfonium hexafluorophosphate (CPI-100p: made by San-Apro Ltd.), p-(phenylthio)phenyldiphenyl sulfoniumhexafluoroantimonate (CPI-100A: made by San-Apro Ltd.), a p-(phenylthio)phenyldiphenylsulfonium hexafluorophosphate compound (CPI-200K, CPI-2105: made by San-Apro Ltd.); bis(cyclohexylsulfonyl)diazomethane (WPAG-145: made by Wako Pure Chemical Industries, Ltd.), bis(t-butylsulfonyl)diazomethane (WPAG-170: made by Wako Pure Chemical Industries, Ltd.), bis(p-toluenesulfonyl)diazomethane (WPAG-199: made by Wako Pure Chemical Industries, Ltd.), triphenylsulfoniumtrifluoromethane sulfonate (WPAG-281: made by Wako Pure Chemical Industries, Ltd.), diphenyl-4-methylphenylsulfonium trifluoromethanesulfonate (WPAG-336: made by Wako Pure Chemical Industries, Ltd.), diphenyl-2,4,6-trimethylphenylsulfonium p-toluenesulfonate (WPAG-367: made by Wako Pure Chemical Industries, Ltd.), bis(alkylphenyl [having 10 to 14 carbons]) iodonium hexafluorophosphate (WPI-113: made by Wako Pure Chemical Industries, Ltd.); and 4-isobutyl-phenyl(4-methylpheny)iodonium hexafluorophosphate (Irgacure 250: made by BASF Corporation). The photoacid generators may be used alone in one kind or in combination with two or more kinds or with a photosensitizer.

A whole amount of blending the acid compound, the acid generator and the photoacid generator is in the range of approximately 0.01 to 50% by mass, preferably, in the range of approximately 0.1 to approximately 30% by mass, based on the total mass of the photoalignable polymer composition of the invention.

The photoalignable polymer composition of the invention is suitably applied onto the substrate, laminated thereon, and used as a liquid crystal alignment film, for example. Therefore, characteristics necessary for an optical film, an optical display device or the like, such as alignment ability, adhesion with the substrate and a polymerized liquid crystal film, application uniformity, chemical resistance, heat resistance, transmittance and gas barrier properties, may be occasionally required. Therefore, various kinds of additives may be contained in the photoalignable polymer composition for the purpose of providing the composition with the characteristics or the like.

Specific examples of the additives include a polymer dispersing agent, an applicability improver, an adhesion improver, an ultraviolet light absorber, an agglomeration inhibitor, an alkali solubility accelerator, a sensitizer and a crosslinking agent.

Specific examples of the polymer dispersing agents include an acrylic polymer dispersing agent, a styrenic polymer dispersing agent, an ethyleneimine polymer dispersing agent and a urethane polymer dispersing agent. Specific examples of the applicability improver include a silicone resin. Specific examples of the adhesion improver include a silane coupling agent. Specific examples of the ultraviolet light absorber include alkoxy benzophenones. Specific examples of the agglomeration inhibitor include sodium polyacrylate. Specific examples of the alkali solubility accelerator include organic carboxylic acid.

As the sensitizer, a colorless sensitizer and a triplet sensitizer are preferred. Specific examples of the photosensitizers include an aromatic nitro compound, coumarin (7-diethylamino-4-methylcoumarin, 7-hydroxy-4-methylcoumarin, ketocoumarin and carbonylbiscoumarin), aromatic 2-hydroxyketone, and amino-substituted, aromatic 2-hydroxyketone (2-hydroxybenzophenone, or mono- or di-p-(dimethylamino)-2-hydroxybenzophenone), acetophenone, anthraquinone, xanthone, thioxanthone, benzanthrone, thiazoline (2-benzoylmethylene-3-methyl-β-naphthothiazoline, 2-(β-naphthoylmethylene)-3-methylbenzothiazoline, 2-(α-naphthoylmethylene)-3-methylbenzothiazoline, 2-(4-biphenoylmethylene)-3-methylbenzothiazoline, 2-(β-naphthoylmethylene)-3-methyl-β-naphthothiazoline, 2-(4-biphenoylmethylene)-3-methyl-β-naphthothiazoline, 2-(p-fluorobenzoylmethylene)-3-methyl-β-naphthothiazoline), oxazoline (2-benzoylmethylene-3-methyl-β-naphthoxazoline, 2-(β-naphthoylmethylene)-3-methylbenzoxazoline, 2-(α-naphthoylmethylene)-3-methylbenzoxazoline, 2-(4-biphenoylmethylene)-3-methylbenzoxazoline, 2-(β-naphthoylmethylene)-3-methyl-β-naphthoxazoline, 2-(4-biphenoylmethylene)-3-methyl-β-naphthoxazoline, 2-(p-fluorobenzoylmethylene)-3-methyl-β-naphthoxazoline), benzothiazole, nitroaniline (m- or p-nitroaniline and 2,4,6-trinitroaniline) or nitroacenaphthene (5-nitroacenaphthene), (2-[(m-hydroxy-p-methoxy)styryl]benzothiazole, benzoin alkyl ether, N-alkylated phthalone, acetophenone ketal (2,2-dimethoxyphenylethanone), naphthalene (2-naphthalene methanol, 2-naphthalene carboxylic acid), anthracene (9-anthracene methanol, 9,10-dipropoxyanthracene, 9,10-dibutoxyanthracene and 9-anthracene carboxylic acid), benzopyran, azoindolizine and furocoumarin. Among the photosensitizers, aromatic 2-hydroxyketone (benzophenone), coumarin, ketocoumarin, carbonylbiscoumarin, acetophenone, anthraquinone, xanthone, thioxanthone and acetophenone ketal are preferred.

Specific examples of the crosslinking agents include an oxirane compound, a melamine compound, an epoxy compound, an isocyanate compound, a glycoluril compound and a bisazide compound.

An amount of adding the various kinds of additives is appropriately determined depending on an application, the characteristics or the like, but is ordinarily in the range of approximately 0.01 to approximately 50% by mass, preferably, in the range of approximately 0.01 to approximately 30% by mass, based on the total mass of the first component and the second component. In addition, an amount of adding the sensitizer and the crosslinking agent is ordinarily in the range of approximately 0.01 to approximately 50% by mass based on the total mass of the first component and the second component.

As the additives, a coupling agent, a surfactant or the like can also be used in addition thereto.

The coupling agent is used in order to improve the adhesion with the substrate. Specific examples of the coupling agents include a silane coupling agent such as 3-glycidoxypropyldimethylethoxysilane, 3-glycidoxypropylmethyldiethoxysilane and 3-glycidoxypropyltrimethoxysilane; an aluminum coupling agent such as acetoalkoxyaluminumdiisopropylate; and a titanate coupling agent such as tetraisopropylbis(dioctylphosphite)titanate. An amount of adding the coupling agent is ordinarily approximately 10 parts by mass or less based on 100 parts by mass of the components (solid) excluding the solvent contained in the photoalignable polymer composition.

The surfactant is used in order to improve wettability to a base substrate, levelability and applicability thereto. Specific examples of the surfactants include a fluorine surfactant such as MEGAFAC F-555, MEGAFAC F-556, MEGAFAC F-557, MEGAFAC F-558, MEGAFAC F-559 and MEGAFAC F-561 as made by DIC, Inc.; a silicone surfactant such as Byk-300, Byk-306, Byk-335, Byk-310, Byk-341, Byk-344 and Byk-370 as made by BYK-Chemie GmbH; an acrylic surfactant such as Byk-354, Byk-358 and Byk-361 as made by BYK-Chemie GmbH; and a fluorine surfactant such as SC-101 made by Asahi Glass Co., Ltd., and EF-351 and EF-352 as made by Tohchem Products Corporation. An amount of adding the surfactant is ordinarily in the range of approximately 0.01 to approximately 1 part by mass based on 100 parts by mass of the photoalignable polymer composition.

The photoalignable polymer composition of the invention may further contain a solvent in order to apply the composition, for example, as a photoaligning agent, to the base material. Such a solvent preferably can dissolve the first component and the second component. Specific examples of the solvent include a glycol solvent such as ethylene glycol, diethylene glycol, triethylene glycol and propylene glycol; a glycol ether solvent such as diethylene glycol monomethyl ether, triethylene glycol monomethyl ether, propylene glycol monomethyl ether, 1-methoxy-2-propanol, 2-ethoxyethanol, 3-propoxyethanol and 3-methoxy-3-methyl-1-butanol, a glycol ester solvent such as propylene glycol-1-monomethyl ether acetate, a ketone solvent such as cyclopentanone, cyclohexanone, methyl ethyl ketone and methyl isobutyl ketone, an aromatic hydrocarbon solvent such as toluene, p-cymene and limonene, and a cycloalkane solvent such as cyclohexane. When the glycol ether solvent is used among the solvents, even if the composition is applied as the photoaligning agent or the like to a substrate formed of triacetyl cellulose (TAC), the solvent does not tend to corrode the substrate. Furthermore, in order to improve the adhesion with the substrate, a mixed solvent prepared by adding a 2-ethoxyethanol solvent to the glycol ether solvent such as 1-methoxy-2-propanol may be occasionally used or the ketone solvent such as cyclopentanone, cyclohexanone and methyl isobutyl ketone may be occasionally mixed with the glycol ether solvent such as 1-methoxy-2-propanol. An amount to be mixed is in the range of approximately 1 to approximately 50% by mass, preferably, in the range of approximately 5 to approximately 30% by mass, further preferably, in the range of approximately 10 to approximately 25% by mass, based on the glycol ether solvent. Moreover, several kinds of solvents may be occasionally mixed in order to uniformize a film surface during film formation. Specific examples include a mixed solvent of a ketone solvent, an aromatic hydrocarbon solvent and a cycloalkane solvent, and a mixed solvent of a glycol ether solvent and an aromatic hydrocarbon solvent. The solvent to be used may occasionally influence solubility of a photoalignment film polymer, adhesion with the substrate, film surface uniformity during film formation, and sensitivity of alignment of polymerizable liquid crystals during preparation of a phase difference film. Use of a solvent to satisfy the characteristics is required.

An amount of adding the solvent is ordinarily in the range of approximately 70 to approximately 99 parts by mass based 100 parts by mass of a total of the first component and the second component.

The photoalignment film can be obtained by applying the photoalignable polymer composition containing the solvent onto the base material or the like, removing the solvent to obtain a laminated film, and then irradiating the film with light such as polarized light. Application to the base material or the like can be performed according to a publicly known method such as a spin coating method, a gravure coater method, a reverse gravure method, a Mayer bar coater method, a die coater method, a reverse roll coater method, a fountain reverse roll coater method, a kiss roll coater method, a bar coater method, a knife coater method, a lip coater method and a resist coater method.

After the laminated film is obtained by removing the solvent after the application as described above, the film is irradiated with light such as polarized light. Irradiation with light is preferably performed from a single direction to the film. Molecules in the photoalignable group included in the photoalignable polymer included in the film are aligned by the irradiation with light, and a photoalignment function and optical anisotropy are developed. Therefore, the photoalignment film can be suitably used as the liquid crystal alignment film.

Specific examples of light applied to the irradiation include X-rays, an electron beam, ultraviolet light, visible light and infrared light (heat rays). Among the types of light, ultraviolet light is preferred. Wavelength of ultraviolet light is preferably approximately 400 nanometers or less, further preferably, in the range of approximately 180 to approximately 360 nanometers. As a light source, a low-pressure mercury lamp, a high-pressure mercury lamp, an ultra-high-pressure mercury lamp, a high-pressure discharge lamp, a short arc discharge lamp or the like is preferred.

As long as an alignment function can be provided, irradiation with light may be performed using unpolarized light, but preferably is performed using linearly polarized light. Irradiance is preferably in the range of approximately 5 mJ/cm$^2$ to approximately 2,000 mJ/cm$^2$, further preferably, in the range of approximately 10 mJ/cm$^2$ to approximately 1,000 mJ/cm$^2$.

The thus obtained photoalignment film can be suitably used, for example, as the liquid crystal alignment film.

The optical film can be obtained using the liquid crystal alignment film of the invention. The optical film is suitable for an optical compensation film, a phase difference plate such as a patterned phase difference plate, or the like for realizing an improvement in contrast or extension of a viewing angle range of a liquid crystal display device.

The optical film generally has the base material, the liquid crystal alignment film and an optically anisotropic layer. The optically anisotropic layer can be obtained by applying onto the liquid crystal alignment film formed on the base material a polymerizable liquid crystal composition containing a polymerizable liquid crystal compound, and also various components to be added as required, and aligning molecules of the liquid crystal compound, and then polymerizing the compound. The optically anisotropic layer shows the optical anisotropy developed by alignment of the molecules of the liquid crystal compound. Therefore, the optical film can be suitably used, for example, as the patterned phase difference plate. Such an optical film can be suitably used for various kinds of optical devices, for example, the liquid crystal display device.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted, to limit the scope of the invention.

EXAMPLES

Hereinafter, the invention will be explained more specifically by way of Examples, but the invention is not limited by the Examples. A structure of a compound was confirmed by a nuclear magnetic resonance spectrum. Moreover, a phase transition temperature was also measured. A unit of the phase transition temperature is degree Centigrade (° C.), and a symbol C stands for crystals, a symbol N stands for a nematic phase, a symbol SA stands for a smectic A phase, a symbol SB stands for a smectic B phase, and a symbol I stands for an isotropic liquid phase. In the following, methods for measuring physical properties will be shown.

Preparation of Substrate with Photoalignment Film

A photoalignable polymer composition (photoaligning agent) was applied onto a glass substrate or a TAC substrate using a spin coater or a bar coater, and then the substrate was heated at a temperature in the range of 60 to 130° C. for 1 to 3 minutes to remove a solvent, and thus a coating film was formed. A substrate with a photoalignment film was prepared by irradiating a surface of the coating film with linearly polarized ultraviolet light having a wavelength in the vicinity of 313 nanometers from a direction at 90 degrees relative to an applied surface by means of an ultra-high-pressure mercury lamp.

Preparation of Optical Phase Difference Plate

A solution containing a polymerizable liquid crystal composition was applied onto a substrate with a photoalignment film, and then the substrate was heated at 60° C. for 1 minute, and thus a solvent was removed. Then, a coating film of polymerizable liquid crystals was formed by cooling the substrate at room temperature for 1 minute. An optical phase difference plate was prepared by irradiating the substrate with light having an intensity of 90 mW/cm$^2$ (365 nm) using a 500 W ultra-high-pressure mercury lamp at room temperature for 30 seconds under a nitrogen atmosphere or in atmospheric air.

Confirmation of Alignment of Liquid Crystal Molecules

A substrate with a photoalignment film, wherein polymerizable liquid crystals were applied onto the substrate, was inserted between two polarizing plates arranged in a crossed nicol configuration, and observed. The substrate was rotated in a horizontal plane, and then a state of contrast and presence or absence of an alignment defect were confirmed.

Confirmation of Sensitivity of Photoalignment Film

Upon irradiating a substrate with a photoalignment film with linearly polarized ultraviolet light, an optical phase difference plate was prepared by irradiating with light having intensity in the range of 5 to 100 mJ/cm$^2$ (313 nm), and then alignment of liquid crystal molecules was confirmed and a minimum exposure amount at which the liquid crystal molecules align was described as alignment sensitivity.

Measurement of Weight Average Molecular Weight (MW)

Shimadzu LC-9A Gel Permeation Chromatograph (GPC) made by Shimadzu Corporation and a column Shodex GF-7M HQ (eluent: DMF or THF, and a standard reference material: polystyrene having known molecular weight) made by Showa Denko were used.

Measurement of Film Thickness

An anisotropic polymer layer on a substrate with an anisotropic polymer was shaved off, and a profile thereof was measured by means of a surface texture measuring apparatus (Alpha-Step IQ made by KLA-Tencor Corporation).

Confirmation of Solubility

A photoaligning agent having a concentration of 20% by mass was diluted with cyclopentanone or 1-methoxy-2-propanol until a concentration of the aligning agent became 5% by mass, and solubility of a photoalignable polymer composition was confirmed. When the solution was clouded or had a remaining solid at room temperature, the composition was evaluated to be undissolved.

Adhesion Test

In accordance with the method as described in JIS K5400, a surface of a substrate with optical phase difference film was cut in 100 squares in a cross-cut shape by using a cutter knife, a cellophane tape was once adhered thereon, and then peeled off, and then strength of adhesion was evaluated by expressing a ratio of the number of squares remaining on the substrate to 100 squares as a film remaining ratio (%) (a higher remaining ratio means a higher strength of adhesion).

Preparation of Polymerizable Liquid Crystal Composition (1)

Four compounds were mixed at a ratio of compound (LC-1):compound (LC-2):compound (LC-3):compound (LC-4)=50:15:10:25 (mass ratio). The composition was designated as MIX1. Based on the total mass of the MIX1, a nonionic fluorine surfactant (Futargent (registered trade name) FTX-218, made by Neos Co., Ltd.) at a mass ratio of 0.002, and a polymerization initiator Irgacure 907 (registered trade name, made by BASF Corporation) at a mass ratio of 0.06 were added thereto. A methyl isobutyl ketone (MIBK) solvent was added to the composition, and thus prepared polymerizable liquid crystal composition (1) in which a ratio of the solvent was 80% by mass.

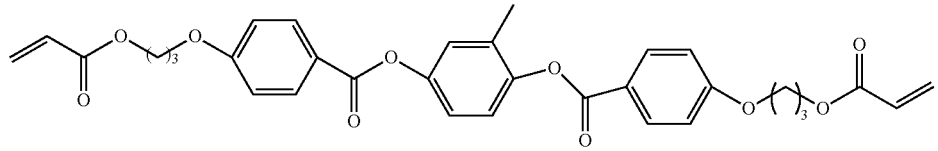

(LC-1)

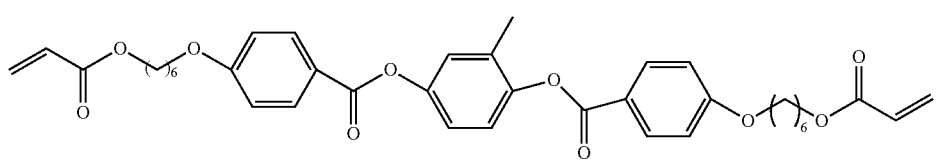
(LC-2)

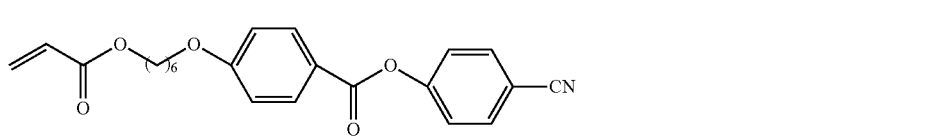
(LC-3)

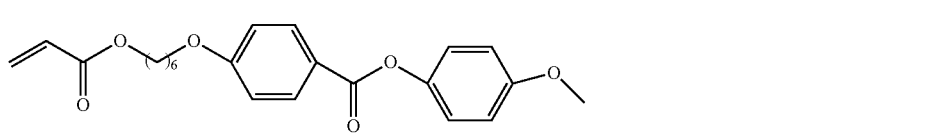
(LC-4)

Compound (LC-1) and compound (LC-2) can be manufactured by the method disclosed in Makromolekulare Chemie, 190(9), 3201-3215 (1989) by Dirk J. Broer et al., or a similar method. Compound (LC-3) was manufactured in accordance with the method described in DE 2722589 A1. Compound (LC-4) was manufactured by the method described in Makromolekulare Chemie 183(10), 2311-21 (1982) by Michael Portugall et al.

Synthesis Example 1

Monomer (1-1) having a photoalignable group (as included in monomer I-1-1-a described above) was prepared as described below.

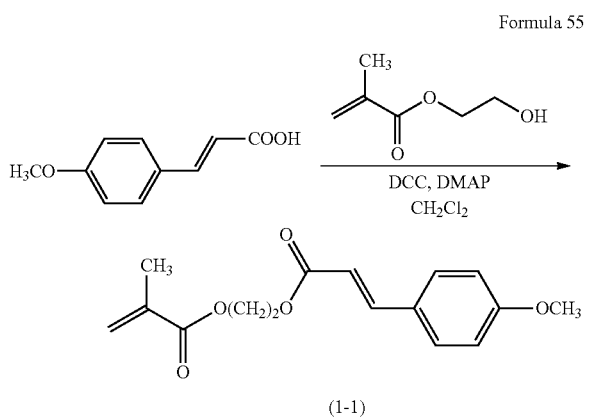

Formula 55

(1-1)

Then, 22.8 g of methoxycinnamic acid, 16.7 g of 2-hydroxybutyl methacrylate and 3.2 g of 4-dimethylaminopyridine (DMAP) were added to 230 mL of dichloromethane, and the resultant mixture was stirred under a nitrogen atmosphere. Thereto, a dichloromethane (60 mL) solution containing 27.7 g of 1,3-dicyclohexylcarbodiimide (DCC) was added dropwise. After dropwise addition, the resultant mixture was stirred at room temperature for 8 hours. A precipitate formed was filtered off, and an organic layer was washed with water and dried over anhydrous magnesium sulfate. A solvent was distilled off under reduced pressure, a residue was purified by means of column chromatography, and recrystallized in ethanol, and thus 30.0 g of monomer (1-1) having the photoalignable group was obtained. Measurement results of phase transition temperature and nuclear magnetic resonance spectrum of monomer (1-1) obtained were as described below.

Phase transition temperature: C 37 I.

$^1$H-NMR (CDCl$_3$; δ ppm): 7.67 (d, 1H), 7.49 (d, 2H), 6.91 (d, 2H), 6.33 (d, 1H), 6.16 (s, 1H), 5.60 (s, 1H), 4.48-4.40 (m, 4H), 3.84 (s, 3H), 1.96 (s, 3H).

Synthesis Example 2

Monomer (1-2) having a photoalignable group (as included in monomer I-2-1-a described above) was prepared as described below.

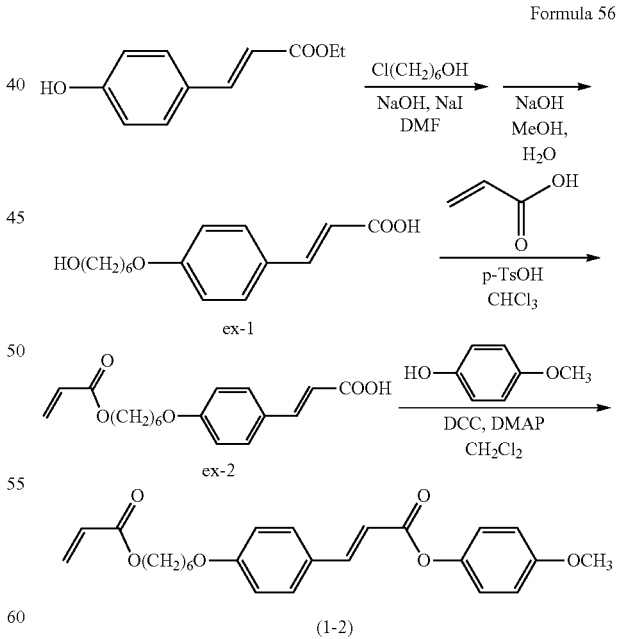

Formula 56

(1-2)

(First Step)

Then, 1,120 mmol of ethyl 4-hydroxycinnamate, 1,230 mmol of sodium hydroxide and 120 mmol of sodium iodide were added to 1,000 mL of N,N-dimethylformamide (DMF), and the resultant mixture was stirred at 60° C. under a nitrogen atmosphere. Thereto, 1,230 mmol of 6-chlorohexanol was added dropwise. After dropwise addition, the resultant mixture was stirred at 80° C. for 8 hours. Ethyl acetate and water were added to a reaction mixture, and an organic layer was extracted. The resultant organic layer was washed with water and dried over anhydrous magnesium sulfate. A solvent was distilled off under reduced pressure. The resultant residue and 1,230 mmol of sodium hydroxide were added to a mixed solution of water (800 mL) and methanol (800 mL), and the resultant mixture was stirred for 3 hours under heating reflux. A solvent was distilled off under reduced pressure, and the resultant residue was poured into 3 N hydrochloric acid to be reprecipitated. Crystals were filtered off and recrystallized in methanol, and thus 840 mmol of compound (ex-1) was obtained.

(Second Step)

Then, 110 mmol of compound (ex-1), 1,100 mmol of acrylic acid and 240 mmol of p-toluenesulfonic acid (p-TsOH) were added to 600 mL of chloroform, and the resultant mixture was stirred for 8 hours while water was removed under heating reflux using a Dean-Stark apparatus. Water was added to a reaction mixture, and an organic layer was extracted and dried over anhydrous magnesium sulfate. A solvent was distilled off under reduced pressure. The resultant residue was recrystallized in a mixed solvent of chloroform and methanol, and thus 34 mmol of compound (ex-2) was obtained.

(Third Step)

Then, 16 mmol of compound (ex-2), 16 mmol of 4-methoxyphenol and 3 mmol of 4-dimethylaminopyridine (DMAP) were added to 50 mL of dichloromethane, and the resultant mixture was stirred under a nitrogen atmosphere. Thereto, a dichloromethane (10 mL) solution containing 17 mmol of 1,3-dicyclohexylcarbodiimide (DCC) was added dropwise. After dropwise addition, the resultant mixture was stirred at room temperature for 8 hours. A precipitate formed was filtered off, and an organic layer was washed with water and dried over anhydrous magnesium sulfate. A solvent was distilled off under reduced pressure, the resultant residue was purified by means of column chromatography, and recrystallized in ethanol, and thus 12 mmol of monomer (1-2) having the photoalignable group was obtained. Measurement results of phase transition temperature and nuclear magnetic resonance spectrum of monomer (1-2) obtained were as described below.

Phase transition temperature: C 64 (SB 34 SA 63) N 93 I.

$^1$H-NMR (CDCl$_3$; δ ppm): 7.81 (d, 1H), 7.52 (d, 2H), 7.07 (m, 2H), 6.92 (m, 4H), 6.47 (d, 1H), 6.40 (dd, 1H), 6.12 (m, 1H), 5.82 (dd, 1H), 4.17 (t, 2H), 4.00 (t, 2H), 3.81 (s, 3H), 1.79 (m, 2H), 1.70 (m, 2H), 1.54-1.44 (m, 4H).

Synthesis Example 3

Monomer (1-3) having a photoalignable group (as included in monomer I-3-1-a described above) was prepared as described below.

Formula 57

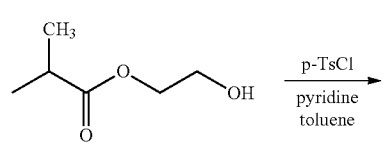

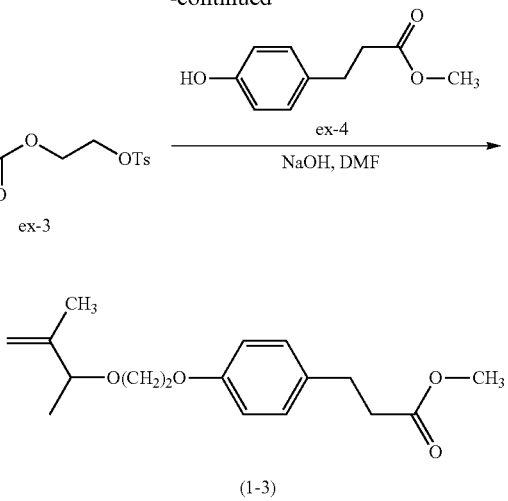

(First Step)

Then, 50 g of 2-hydroxybutyl methacrylate and 50 mL of pyridine were added to 150 mL of toluene, 80 g of p-toluenesulfonic acid chloride was added under cooling, and the resultant mixture was stirred at room temperature for 16 hours under a nitrogen atmosphere. A precipitated salt was removed by filtration under reduced pressure. Water (100 mL) was added to a filtrate, and the resultant mixture was stirred at 40° C. for 2 hours. An organic layer was separated, and the resultant organic layer was sequentially washed with 2 N hydrochloric acid, a saturated aqueous solution of sodium hydrogencarbonate, and water, and dried over anhydrous magnesium sulfate. Toluene was distilled off under reduced pressure, and thus 98 g of crude colorless liquid (ex-3) was obtained.

(Final Step)

Then, 30 g of compound (ex-4) and 7.4 g of sodium hydroxide were added to 150 mL of N,N-dimethylformamide (DMF), and the resultant mixture was stirred at 50° C. under a nitrogen atmosphere. Thereto, 48 g of compound (ex-3) was added dropwise. After dropwise addition, the resultant mixture was stirred at 80° C. for 8 hours. After the resultant mixture was cooled to room temperature, 200 mL of ethyl acetate and water (150 mL) were added, and an organic layer was separated. A precipitate formed was filtered off, and the resultant organic layer was washed with water and dried over anhydrous magnesium sulfate. The resultant organic layer was sequentially washed with 2 N hydrochloric acid, a saturated aqueous solution of sodium hydrogencarbonate, and water, and dried over anhydrous magnesium sulfate. Ethyl acetate was distilled off under reduced pressure, the resultant residue was purified by means of column chromatography (silica gel, eluate: toluene-ethyl acetate mixture (volume ratio: toluene/ethyl acetate=8/1)), and recrystallized in methanol, and thus 27 g of compound (1-3) was obtained.

Measurement results of phase transition temperature and nuclear magnetic resonance spectrum of compound (1-3) obtained were as described below.

Phase transition temperature: C 83 I.

$^1$H-NMR (CDCl$_3$; δ ppm): 7.65 (d, 1H), 7.48 (d, 2H), 6.92 (m, 2H), 6.32 (d, 1H), 6.14 (d, 1H), 5.60 (s, 1H), 4.51 (t, 2H), 4.25 (t, 2H), 3.80 (s, 3H), 1.95 (s, 3H).

Preparation Example 1

Preparation of Photoalignable Polymer (i3-1) Forming a First Component

Then, 2.10 g of monomer (1-3) having the photoalignable group obtained in Synthesis Example 3, 0.90 g of 2-hydroxyethyl methacrylate, and 0.03 g of azobisisobutyronitrile (AIBN) were added to 1-methoxy-2-propanol to prepare 15 g of solution, and the resultant mixture was stirred for 10 hours under heating reflux under a nitrogen atmosphere, and polymerization was performed. As a result, a solution of photoalignable polymer (i3-1) was obtained. Mw of the photoalignable polymer (i3-1) obtained was 71,000.

Preparation Example 2

Preparation of Polymer (ii1-1) Having a Reactive Group Forming a Second Component Then, 2.10 g of monomer (1-3) having the photoalignable group obtained in Synthesis Example 3, 0.90 g of 3-methacryloxypropyl trimethoxysilane (Sila-Ace 5710) (registered trade name, made by JNC Corporation) and 0.03 g of azobisisobutyronitrile (AIBN) were added to 1-methoxy-2-propanol to prepare 15 g of solution, and the resultant mixture was stirred for 10 hours under heating reflux under a nitrogen atmosphere, and polymerization was performed. As a result, a solution of polymer (iii-1) having a reactive group was obtained. Mw of polymer (iii-1) having the reactive group was 43,000. In addition, polymer (iii-1) having the reactive group has a photoalignable group.

Preparation Example 3

Preparation of Polymer (ill-2) Having a Reactive Group Forming a Second Component Then, 1.50 g of monomer (1-3) having the photoalignable group obtained in Synthesis Example 3, 0.3 g of methyl methacrylate and 1.20 g of 3-methacryloxypropyl trimethoxysilane (Sila-Ace 5710) (registered trade name, made by JNC Corporation) and 0.03 g of azobisisobutyronitrile (AIBN) were added to 1-methoxy-2-propanol to prepare 15 g of solution, and the resultant mixture was stirred for 10 hours under heating reflux under a nitrogen atmosphere, and polymerization was performed. As a result, a solution of polymer (ii1-2) having a reactive group was obtained. Mw of polymer (ii1-2) having the reactive group was 51,000. In addition, polymer (ii1-2) having the reactive group has a photoalignable group.

Preparation Example 4

Preparation of Polymer (ii2-1) Having a Reactive Group Forming a Second Component Then, 2.85 g of monomer (1-3) having the photoalignable group obtained in Synthesis Example 3, 0.15 g of 2-methacryloiloxyethyl isocyanate (KARENZ MOIR, made by Showa Denko K. K.), and 0.03 g azobisisobutyronitrile (AIBN) were added to cyclopentanone to prepare 15 g of solution, and the resultant mixture was stirred for 10 hours under heating reflux under a nitrogen atmosphere, and polymerization was performed. As a result, a solution of polymer (ii2-1) having a reactive group was obtained. Mw of polymer (ii2-1) having the reactive group was 73,000. In addition, polymer (ii2-1) having the reactive group has a photoalignable group.

Preparation Example 5

Preparation of Polymer (ill-3) Having a Reactive Group Forming a Second Component Then, 2.85 g of monomer (1-3) having the photoalignable group obtained in Synthesis Example 3, 0.15 g of 3-methacryloxypropylmethyl dimethoxysilane (KBM-502, made by Shin-Etsu Chemical Co., Ltd.) and 0.03 g of azobisisobutyronitrile (AIBN) were added to cyclopentanone to prepare 15 g of solution, and the resultant mixture was stirred for 10 hours under heating reflux under a nitrogen atmosphere, and polymerization was performed. As a result, a solution of polymer (ii1-3) having a reactive group was obtained. Mw of polymer (ii1-3) having the reactive group was 96,000.

Preparation Example 6

Preparation of Photoalignable Polymer (i3-2) Forming a First Component

Then, 2.10 g of monomer (1-3) having the photoalignable group obtained in Synthesis Example 3, 0.9 g of methyl itaconate and 0.03 g of azobisisobutyronitrile (AIBN) were added to cyclopentanone to prepare 15 g of solution, and the resultant mixture was stirred for hours under heating reflux under a nitrogen atmosphere, and polymerization was performed. As a result, a solution of photoalignable polymer (i3-2) was obtained. Mw of the photoalignable polymer (i3-2) obtained was 55,000.

Preparation Example 7

Preparation of Polymer (ii4-1) Having a Reactive Group Forming a Second Component Then, 2.85 g of monomer (1-3) having the photoalignable group obtained in Synthesis Example 3, 0.15 g of methyl methacrylate glycidyl ether and 0.03 g of azobisisobutyronitrile (AIBN) were added to cyclopentanone to prepare 15 g of solution, and the resultant mixture was stirred for 10 hours under heating reflux under a nitrogen atmosphere, and polymerization was performed. As a result, a solution of polymer (ii4-1) having a reactive group was obtained. Mw of polymer (ii4-1) having the reactive group was 43,000. In addition, polymer (ii4-1) having the reactive group has a photoalignable group.

Example 1

Then, 0.75 g of solution of photoalignable polymer (i3-1) obtained in Preparation Example 1, 0.25 g of solution of polymer (ii1-1) obtained in Preparation Example 2 and 0.005 g of p-toluenesulfonic acid hydrate were mixed to 1-methoxy-2-propanol to form a homogeneous solution, and thus 4.0 g of aligning agent (H-1) containing a photoalignable polymer composition was obtained. The photoaligning agent (H-1) was applied onto a TAC substrate by bar coating. The substrate was heated at 60° C. for 1 minute to remove a solvent, and thus a coating film was formed. A photoalignment film (liquid crystal alignment film) (H-2) having a film thickness of approximately 0.2 micrometer as subjected to photoalignment treatment was obtained by irradiating a surface of the coating film with, at 10 mJ/cm², linearly polarized ultraviolet light having a wavelength of approximately 313 nanometers from a direction at 90 degrees relative to an applied surface by means of an ultra-high-pressure mercury lamp. Onto the photoalignment film, polymerizable liquid crystal composition (1) containing polymerizable liquid crystal composition (MIX1) was applied by spin coating, then the substrate was heated at 60° C. for 1 minute to remove a solvent, and thus a coating film of polymerizable liquid crystals was formed. An optical phase difference plate (H-3) was prepared by irradiating the coating film with light having an intensity of 90 mW/cm$^2$ (365 nm) for 30 seconds. A film remaining ratio by an adhesion test on the optical phase difference plate was 100%. Evaluation results are shown in Table 1 below.

Example 2

Then, 0.90 g of solution of photoalignable polymer (i3-1) obtained in Preparation Example 1, 0.10 g of solution of polymer (ii1-2) obtained in Preparation Example 3 and 0.005 g of p-toluenesulfonic acid hydrate were mixed to 1-methoxy-2-propanol to form a homogeneous solution, and thus 4.0 g of aligning agent (I-1) containing a photoalignable polymer composition was obtained. The photoaligning agent (I-1) was applied onto a TAC substrate by bar coating. The substrate was heated at 80° C. for 1 minute to remove a solvent, and thus a coating film was formed. A photoalignment film (liquid crystal alignment film) (I-2) having a film thickness of approximately 0.2 micrometer as subjected to photoalignment treatment was obtained by irradiating a surface of the coating film with, at 20 mJ/cm$^2$, linearly polarized ultraviolet light having a wavelength of approximately 313 nanometers from a direction at 90 degrees relative to an applied surface by means of an ultra-high-pressure mercury lamp. Onto the photoalignment film, polymerizable liquid crystal composition (1) containing polymerizable liquid crystal composition (MIX1) was applied by spin coating, and then the substrate was heated at 60° C. for 1 minute to remove a solvent, and thus a coating film of polymerizable liquid crystals was formed. An optical phase difference plate (I-3) was prepared by irradiating the coating film with light having an intensity of 90 mW/cm$^2$ (365 nm) for 30 seconds. A film remaining ratio by an adhesion test on the optical phase difference plate was 98%. Evaluation results are shown in Table 1 below.

Example 3

Then, 0.5 g of solution of photoalignable polymer (i3-1) obtained in Preparation Example 1, 0.5 g of solution of polymer (ii2-1) obtained in Preparation Example 4 and 0.002 g of p-toluenesulfonic acid hydrate were mixed to cyclopentanone to form a homogeneous solution, and thus 4.0 g of aligning agent (J-1) containing a photoalignable polymer composition was obtained. The photoaligning agent (J-1) was applied onto a glass substrate by spin coating. The substrate was heated at 100° C. for 1 minute to remove a solvent, and thus a coating film was formed. A photoalignment film (liquid crystal alignment film) (J-2) having a film thickness of approximately 0.2 micrometer as subjected to photoalignment treatment was obtained by irradiating a surface of the coating film with, at 5 mJ/cm$^2$, linearly polarized ultraviolet light having a wavelength of approximately 313 nanometers from a direction at 90 degrees relative to an applied surface by means of an ultra-high-pressure mercury lamp. Onto the photoalignment film, polymerizable liquid crystal composition (1) containing polymerizable liquid crystal composition (MIX1) was applied by spin coating, and then the substrate was heated at 60° C. for 1 minute to remove a solvent, and thus a coating film of polymerizable liquid crystals was formed. An optical phase difference plate (J-3) was prepared by irradiating the coating film with light having an intensity of 90 mW/cm$^2$ (365 nm) for 30 seconds. A film remaining ratio by an adhesion test on the optical phase difference plate was 95%. Evaluation results are shown in Table 1 below.

Example 4

Then, 0.5 g of solution of photoalignable polymer (i3-1) obtained in Preparation Example 1, 0.5 g of solution of polymer (ii1-3) obtained in Preparation Example 5 and 0.002 g of p-toluenesulfonic acid hydrate were mixed to cyclopentanone to form a homogeneous solution, and thus 4.0 g of aligning agent (K-1) containing a photoalignable polymer composition was obtained. The photoaligning agent (K-1) was applied onto a glass substrate by spin coating. The substrate was heated at 100° C. for 1 minute to remove a solvent, and thus a coating film was formed. A photoalignment film (liquid crystal alignment film) (K-2) having a film thickness of approximately 0.2 micrometer as subjected to photoalignment treatment was obtained by irradiating a surface of the coating film with, at 5 mJ/cm$^2$, linearly polarized ultraviolet light having a wavelength of approximately 313 nanometers from a direction at 90 degrees relative to an applied surface by means of an ultra-high-pressure mercury lamp. Onto the photoalignment film, polymerizable liquid crystal composition (1) containing polymerizable liquid crystal composition (MIX1) was applied by spin coating, and then the substrate was heated at 60° C. for 1 minute to remove a solvent, and thus a coating film of polymerizable liquid crystals was formed. An optical phase difference plate (K-3) was prepared by irradiating the coating film with light having an intensity of 90 mW/cm$^2$ (365 nm) for 30 seconds. A film remaining ratio by an adhesion test on the optical phase difference plate was 98%. Evaluation results are shown in Table 1 below.

Example 5

Then, 0.5 g of solution of photoalignable polymer (i3-2) obtained in Preparation Example 6, and 0.5 g of solution of polymer (ii4-1) obtained in Preparation Example 7 were mixed to cyclopentanone to form a homogeneous solution, and thus 4.0 g of aligning agent (L-1) containing a photoalignable polymer composition was obtained. The photoaligning agent (L-1) was applied onto a glass substrate by spin coating. The substrate was heated at 130° C. for 1 minute to remove a solvent, and thus a coating film was formed. A photoalignment film (liquid crystal alignment film) (L-2) having a film thickness of approximately 0.2 micrometer as subjected to photoalignment treatment was obtained by irradiating a surface of the coating film with, at 5 mJ/cm$^2$, linearly polarized ultraviolet light having a wavelength of approximately 313 nanometers from a direction at 90 degrees relative to an applied surface by means of an ultra-high-pressure mercury lamp. Onto the photoalignment film, polymerizable liquid crystal composition (1) containing polymerizable liquid crystal composition (MIX1) was applied by spin coating, and then the substrate was heated at 60° C. for 1 minute to remove a solvent, and thus a coating film of polymerizable liquid crystals was formed. An optical phase difference plate (L-3) was prepared by irradiating the coating film with light having an intensity of 90 mW/cm$^2$ (365 nm) for 30 seconds. A film remaining ratio by an adhesion test on the optical phase difference plate was 100%. Evaluation results are shown in Table 1 below.

Preparation Example 8

Then, 3.0 g of monomer (1-3) having the photoalignable group obtained in Synthesis Example 3, and 0.03 g of azobisisobutyronitrile (AIBN) were added to cyclopentanone to prepare 15 g of solution, the resultant mixture was stirred for 10 hours under heating reflux under a nitrogen atmosphere, and polymerization was performed. As a result, a solution of photoalignable polymer (M-1) was obtained. Mw of the photoalignable polymer (M-1) obtained was 65,000. In addition, photoalignable polymer (M-1) has neither a hydroxyl group nor a carboxyl group.

Comparative Example 1

Then, 1.0 g of solution of only photoalignable polymer (i3-1) obtained in Preparation Example 1 was mixed to 1-methoxy-2-propanol to form a homogeneous solution, and thus 4.0 g of aligning agent (N-1) containing a photoalignable polymer was obtained. The photoaligning agent (N-1) was applied onto a glass substrate by spin coating. The substrate was heated at 80° C. for 1 minute to remove a solvent, and thus a coating film was formed. A photoalignment film (liquid crystal alignment film) (N-2) having a film thickness of approximately 0.2 micrometer as subjected to photoalignment treatment was obtained by irradiating a surface of the coating film with, at 20 mJ/cm$^2$, linearly polarized ultraviolet light having a wavelength of approximately 313 nanometers from a direction at 90 degrees relative to an applied surface by means of an ultra-high-pressure mercury lamp. A film remaining ratio by an adhesion test was 90%. A similar operation was also performed for a TAC substrate, and a photoalignment film (liquid crystal alignment film) (N-3) having a film thickness of approximately 0.2 micrometer was prepared by irradiating a surface of the coating film with, at 40 mJ/cm$^2$, linearly polarized ultraviolet light. Onto the photoalignment film, polymerizable liquid crystal composition (1) containing polymerizable liquid crystal composition (MIX1) was applied by spin coating, then the substrate was heated at 60° C. for 1 minute to remove a solvent, and thus a coating film of polymerizable liquid crystals was formed. An optical phase difference plate (N-4) was prepared by irradiating the coating film with light having an intensity of 90 mW/cm$^2$ (365 nm) for 30 seconds. A film remaining ratio by an adhesion test on the optical phase difference plate was 70%. Evaluation results are shown in Table 1 below.

Comparative Example 2

Then, 1.0 g of solution of only photoalignable polymer (M-1) obtained in Preparation Example 8 was mixed to cyclopentanone to form a homogeneous solution, and thus 4.0 g of aligning agent (O-1) containing a photoalignable polymer was obtained. The photoaligning agent (O-1) was applied onto a glass substrate by spin coating. The substrate was heated at 80° C. for 1 minute to remove a solvent, and thus a coating film was formed. A photoalignment film (liquid crystal alignment film) (O-2) having a film thickness of approximately 0.2 micrometer as subjected to photoalignment treatment was obtained by irradiating a surface of the coating film with, at 10 mJ/cm$^2$, linearly polarized ultraviolet light having a wavelength of approximately 313 nanometers from a direction at 90 degrees relative to an applied surface by means of an ultra-high-pressure mercury lamp. Onto the photoalignment film, polymerizable liquid crystal composition (1) containing polymerizable liquid crystal composition (MIX1) was applied by spin coating, then the substrate was heated at 60° C. for 1 minute to remove a solvent, and thus a coating film of polymerizable liquid crystals was formed. An optical phase difference plate (O-3) was prepared by irradiating the coating film with light having an intensity of 90 mW/cm$^2$ (365 nm) for 30 seconds. A film remaining ratio by an adhesion test on the optical phase difference plate was 5%. A similar operation was also performed for a TAC substrate, and a photoalignment film (O-4) was prepared by irradiating the coating film with, at 50 mJ/cm$^2$, linearly polarized ultraviolet light. Onto the photoalignment film, polymerizable liquid crystal composition (1) containing polymerizable liquid crystal composition (MIX1) was applied by spin coating, then the substrate was heated at 60° C. for 1 minute to remove a solvent, and thus a coating film of polymerizable liquid crystals was formed. Light having an intensity of 90 mW/cm$^2$ (365 nm) was irradiated to the coating film for 30 seconds, but the substrate (O-5) showed no liquid crystal alignment properties. Evaluation results are shown in Table 1 below.

Comparative Example 3

Then, 1.0 g of solution of photoalignable polymer (i3-2) obtained in Preparation Example 6 was mixed to cyclopentanone to form a homogeneous solution, and thus 4 g of aligning agent (P-1) containing a photoalignable polymer was obtained. The photoaligning agent (P-1) was applied onto a glass substrate by spin coating. The substrate was heated at 80° C. for 1 minute to remove a solvent, and thus a coating film was formed. A photoalignment film (liquid crystal alignment film) (P-2) having a film thickness of approximately 0.2 micrometer as subjected to photoalignment treatment was obtained by irradiating a surface of the coating film with, at 20 mJ/cm$^2$, linearly polarized ultraviolet light having a wavelength of approximately 313 nanometers from a direction at 90 degrees relative to an applied surface by means of an ultra-high-pressure mercury lamp. Onto the photoalignment film, polymerizable liquid crystal composition (1) containing polymerizable liquid crystal composition (MIX1) was applied by spin coating, then the substrate was heated at 60° C. for 1 minute to remove a solvent, and thus a coating film of polymerizable liquid crystals was formed. An optical phase difference plate (P-3) was prepared by irradiating the coating film with light having an intensity of 90 mW/cm$^2$ (365 nm) for 30 seconds. A film remaining ratio by an adhesion test on the optical phase difference plate was 90%. A similar operation was also performed for a TAC substrate, and a photoalignment film (P-4) was prepared by irradiating the coating film with, at 50 mJ/cm², linearly polarized ultraviolet light. Onto the photoalignment film, polymerizable liquid crystal composition (1) containing polymerizable liquid crystal composition (MIX1) was applied by spin coating, then the substrate was heated at 60° C. for 1 minute to remove a solvent, and thus a coating film of polymerizable liquid crystals was formed. Light having an intensity of 90 mW/cm² (365 nm) was irradiated to the coating film for 30 seconds, but the substrate (P-5) showed no liquid crystal alignment properties. Evaluation results are shown in Table 1 below.

TABLE 1

| | Polymer (1) | Polymer (2) | Substrate | Baking temperature | Sensitivity mJ/cm² | Adhesion test (glass substrate) |
|---|---|---|---|---|---|---|
| Example 1 | i3-1 | ii1-1 | TAC | 60° C. | 10 | 100% |
| Example 2 | i3-1 | ii1-2 | TAC | 80° C. | 20 | 98% |
| Example 3 | i3-1 | li2-1 | Glass | 100° C. | 5 | 95% |
| Example 4 | i3-1 | ii1-3 | Glass | 100° C. | 5 | 98% |
| Example 5 | i3-2 | ii4-1 | Glass | 130° C. | 10 | 100% |
| Comparative Example 1 | i3-1 | | Glass | 80° C. | 20 | 90% |
| | | | TAC | 100° C. | 40 | 70% |
| Comparative Example 2 | M-1 | | Glass | 80° C. | 10 | 5% |
| | | | TAC | 100° C. | No alignment | — |
| Comparative Example 3 | i3-2 | | Glass | 130° C. | 30 | 90% |
| | | | TAC | 100° C. | No alignment | — |

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

A photoalignable polymer composition of the invention contains the first component being a photoalignable polymer and the second component being a polymer that is reactive with the first component. Therefore, a photoalignable film obtained by applying a photoaligning agent containing the composition to a base material or the like and drying the applied composition thereon is excellent in sensitivity to allow photoalignment even with exposure in a short period of time. Thus, the composition is suitable for a photoalignment method. Moreover, a liquid crystal alignment film obtained using the photoalignable polymer composition of the invention requires no rubbing treatment, and therefore has no alignment defect and allows a uniform alignment of liquid crystal molecules. Therefore, the liquid crystal alignment film is suitable for use in the form of an optical film or an optical device such as a liquid crystal display device.

What is claimed is:
1. A photoalignable polymer composition, containing
as a first component,
a photoalignable side-chain polymer
(a) having
(i) at least one photoalignable group and
(ii) at least one polar group selected from the group consisting of a hydroxyl group and a carboxyl group, and

(b) not having an alkoxysilane group, an epoxy group, or an oxetane group; and
as a second component,
a polymer having
(i) a group that is reactive with the at least one polar group and
(ii) a photoalignable group,
wherein the group that is reactive with the at least one polar group is at least one selected from the group consisting of an alkoxysilane group, an epoxy group, and an oxetane group,
wherein the photoalignable side-chain polymer of the first component includes at least one constitutional unit selected from the group consisting of compounds of formulas (I-1-1), (I-2-1) and (I-3-1) below, and a constitutional unit derived from at least one selected from the group consisting of hydroxyalkyl (meth)acrylate having a hydroxyalkyl group having 2 to 6 carbons, carboxyl group-containing (meth)acrylate, carboxyl group-containing itaconate and phenolic hydroxyl group-containing (meth)acrylate:

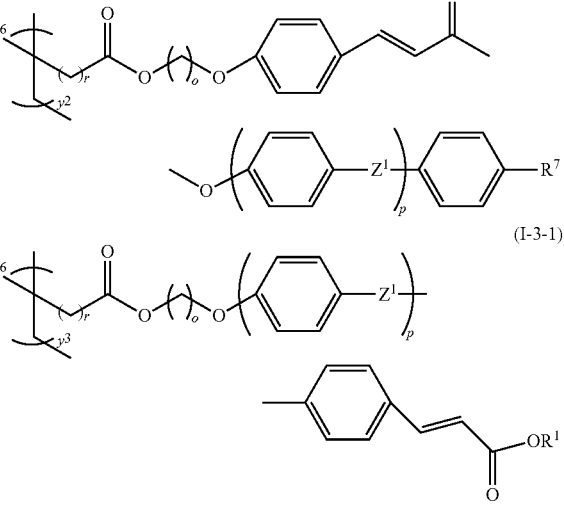

wherein, in the formula, R¹ is hydrogen or an alkyl group having 1 to 20 carbons in which arbitrary hydrogen may be replaced by fluorine, R⁶ is hydrogen, an alkyl group having 1 to 5 carbons in which arbitrary hydrogen may be replaced by fluorine, or a group of the formula (I-4) below, R⁷ is hydrogen, an alkyl group having 1 to 20 carbons in which arbitrary hydrogen may be replaced by fluorine or an alkoxy group having 1 to 20 carbons in which arbitrary hydrogen may be replaced by fluorine, Z¹ is a single bond, —COO— or —OCO—, o is an integer from 2 to 10, p is an integer from 0 to 2, r is 0 or 1, y¹, y² and y³ are a mole fraction and satisfy a relationship (0<y¹+y²+y³<1), and arbitrary hydrogen of a phenylene group may be replaced by fluorine, a methyl group or a methoxy group,

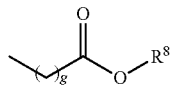
(I-4)

wherein, in the formula, R⁸ is hydrogen or a methyl group, and g is 0 or 1, wherein the group that is reactive with the at least one polar group of the polymer of the second component includes at least one constitutional unit selected from the group consisting of compounds of formulas (II-1-1) and (II-4-1) below:

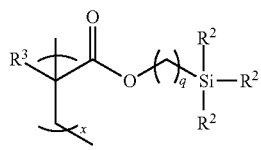
(II-1-1)

wherein, in formula (II-1-1), $R^3$ is hydrogen, an alkyl group having 1 to 20 carbons in which arbitrary hydrogen may be replaced by fluorine, or an alkoxy group having 1 to 20 carbons in which arbitrary hydrogen may be replaced by fluorine, $R^2$ each independently is hydrogen, an alkyl group having 1 to 4 carbons or an alkoxy group having 1 to 4 carbons, at least one of $R^2$ is an alkoxy group having 1 to 4 carbons, q is an integer from 0 to 10, and x is a mole fraction,

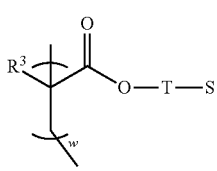
(II-4-1)

(II-4-1-1)

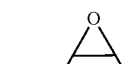
(II-4-1-2)

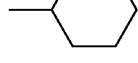

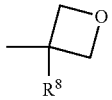
(II-4-1-3)

wherein, in formula (II-4-1) $R^3$ is hydrogen, an alkyl group having 1 to 20 carbons in which arbitrary hydrogen may be replaced by fluorine or an alkoxy group having 1 to 20 carbons in which arbitrary hydrogen may be replaced by fluorine, T is an alkylene group having 1 to 20 carbons in which oxygen may be substituted for arbitrary carbon, however, oxygen is not substituted for adjacent carbons simultaneously, S is a group of the formula (II-4-1-1), (II-4-1-2) or (II-4-1-3), $R^8$ is a methyl group or an ethyl group, and w is a mole fraction; and wherein the photoalignable group of the polymer of the second component includes at least one constitutional unit selected from the group consisting of compounds of formulas (I-1-1), (I-2-1) and (I-3-1) defined above.

2. The photoalignable polymer composition according to claim 1, wherein the photoalignable side-chain polymer of the first component includes at least one constitutional unit of the formula (I-2-1) below, and a constitutional unit derived from hydroxyalkyl (meth)acrylate having a hydroxyalkyl group having 2 to 6 carbons, and the polymer of the second component includes a constitutional unit of the formula (II-1-1) below:

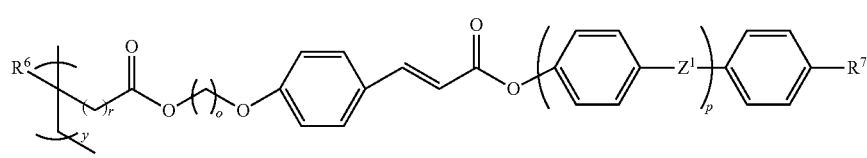
(I-2-1)

wherein, in the formula, $R^6$ is hydrogen, an alkyl group having 1 to 5 carbons in which arbitrary hydrogen may be replaced by fluorine, or a group of the formula (I-4) below, $R^7$ is hydrogen, an alkyl group having 1 to 20 carbons in which arbitrary hydrogen may be replaced by fluorine or an alkoxy group having 1 to 20 carbons in which arbitrary hydrogen may be replaced by fluorine, $Z^1$ is a single bond, —COO— or —OCO—, o is an integer from 2 to 10, p is an integer from 0 to 2, r is 0 or 1, y is a mole fraction satisfying a relationship: 0<y<1, and arbitrary hydrogen of a phenylene group may be replaced by fluorine, a methyl group or a methoxy group:

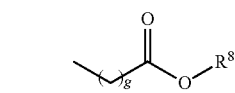
(I-4)

wherein, in the formula, R⁸ is hydrogen or a methyl group, and g is 0 or 1:

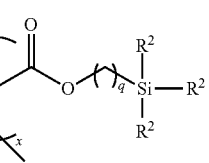
(II-1-1)

wherein, in the formula, $R^3$ is hydrogen, an alkyl group having 1 to 20 carbons in which arbitrary hydrogen may be replaced by fluorine or an alkoxy group having 1 to 20 carbons in which arbitrary hydrogen may be replaced by fluorine, $R^2$ each independently is hydrogen, an alkyl group having 1 to 4 carbons or an alkoxy group having 1 to 4 carbons, at least one of $R^2$ is an alkoxy group having 1 to 4 carbons, q is an integer from 0 to 10, and x is a mole fraction.

3. The photoalignable polymer composition according to claim 1, wherein the photoalignable side-chain polymer of the first component includes at least one constitutional unit of the formula (I-3-1) below, and a constitutional unit derived from hydroxyalkyl (meth)acrylate having a hydroxyalkyl group having 2 to 6 carbons, and the polymer of the second component includes a constitutional unit of the formula (II-1-1) below:

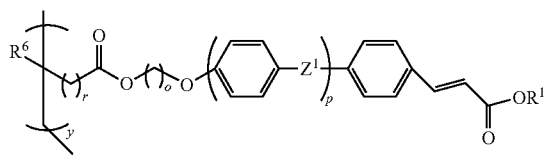
(I-3-1)

wherein, in the formula, $R^1$ is hydrogen or an alkyl group having 1 to 20 carbons in which arbitrary hydrogen may be replaced by fluorine, $R^6$ is hydrogen, an alkyl group having 1 to 5 carbons in which arbitrary hydrogen may be replaced by fluorine, or a group of the formula (I-4) below, $Z^1$ is a single bond, —COO— or —OCO—, o is an integer from 2 to 10, p is an integer from 0 to 2, r is 0 or 1, y is a mole fraction satisfying a relationship: 0<y<1, and arbitrary hydrogen of a phenylene group may be replaced by fluorine, a methyl group or a methoxy group:

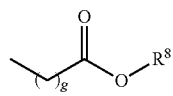
(I-4)

wherein, in the formula, $R^8$ is hydrogen or a methyl group, and g is 0 or 1:

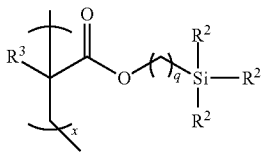
(II-1-1)

wherein, in the formula, $R^3$ is hydrogen, an alkyl group having 1 to 20 carbons in which arbitrary hydrogen may be replaced by fluorine or an alkoxy group having 1 to 20 carbons in which arbitrary hydrogen may be replaced by fluorine, $R^2$ each independently is hydrogen, an alkyl group having 1 to 4 carbons or an alkoxy group having 1 to 4 carbons, at least one of $R^2$ is an alkoxy group having 1 to 4 carbons, q is an integer from 0 to 10, and x is a mole fraction.

4. The photoalignable polymer composition according to claim 1, wherein the photoalignable side-chain polymer of the first component includes at least one constitutional unit of the formula (I-1-1) below, and a constitutional unit derived from at least one monomer selected from the group consisting of carboxyl group-containing (meth)acrylate, carboxyl group-containing itaconate and phenolic hydroxyl group-containing (meth)acrylate, and the polymer of the second component includes a constitutional unit of the formula (II-1-1) below:

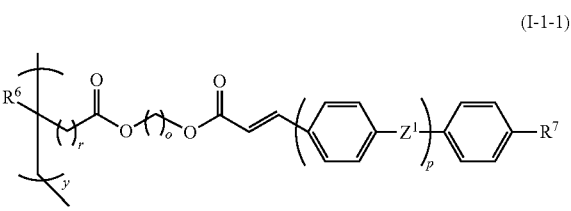
(I-1-1)

wherein, in the formula, $R^6$ is hydrogen, an alkyl group having 1 to 5 carbons in which arbitrary hydrogen may be replaced by fluorine, or a group of the formula (I-4) below, $R^7$ is hydrogen, an alkyl group having 1 to 20 carbons in which arbitrary hydrogen may be replaced by fluorine or an alkoxy group having 1 to 20 carbons in which arbitrary hydrogen may be replaced by fluorine, $Z^1$ is a single bond, —COO— or —OCO—, o is an integer from 2 to 10, p is an integer from 0 to 2, r is 0 or 1, y is a mole fraction satisfying a relationship: 0<y<1, and arbitrary hydrogen of a phenylene group may be replaced by fluorine, a methyl group or a methoxy group:

(I-4)

wherein, in the formula, $R^8$ is hydrogen or a methyl group, and g is 0 or 1:

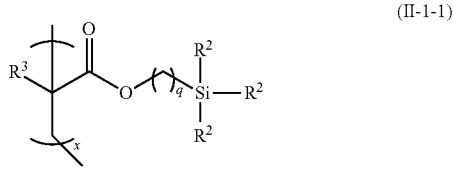
(II-1-1)

wherein, in the formula, $R^3$ is hydrogen, an alkyl group having 1 to 20 carbons in which arbitrary hydrogen may be replaced by fluorine or an alkoxy group having 1 to 20 carbons in which arbitrary hydrogen may be replaced by fluorine, $R^2$ each independently is hydrogen, an alkyl group having 1 to 4 carbons or an alkoxy group having 1 to 4 carbons, at least one of $R^2$ is an alkoxy group having 1 to 4 carbons, q is an integer from 0 to 10, and x is a mole fraction.

5. The photoalignable polymer composition according to claim 1, wherein the photoalignable side-chain polymer of the first component includes at least one constitutional unit of the formula (I-2-1) below, and a constitutional unit derived from at least one monomer selected from the group consisting of carboxyl group-containing (meth)acrylate, carboxyl group-containing itaconate and phenolic hydroxyl group-containing (meth)acrylate, and the polymer of the second component includes a constitutional unit of the formula (II-1-1) below:

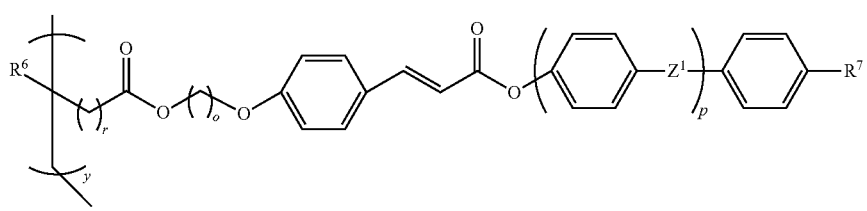
(I-2-1)

wherein, in the formula, R⁶ is hydrogen, an alkyl group having 1 to 5 carbons in which arbitrary hydrogen may be replaced by fluorine, or a group of the formula (I-4) below, R⁷ is hydrogen, an alkyl group having 1 to 20 carbons in which arbitrary hydrogen may be replaced by fluorine or an alkoxy group having 1 to 20 carbons in which arbitrary hydrogen may be replaced by fluorine, $Z^1$ is a single bond, —COO— or —OCO—, o is an integer from 2 to 10, p is an integer from 0 to 2, r is 0 or 1, y is a mole fraction satisfying a relationship: 0<y<1, and arbitrary hydrogen of a phenylene group may be replaced by fluorine, a methyl group or a methoxy group:

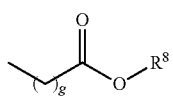
(I-4)

wherein, in the formula, R⁸ is hydrogen or a methyl group, and g is 0 or 1:

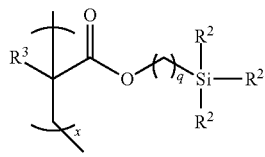
(II-1-1)

wherein, in the formula, R³ is hydrogen, an alkyl group having 1 to 20 carbons in which arbitrary hydrogen may be replaced by fluorine or an alkoxy group having 1 to 20 carbons in which arbitrary hydrogen may be replaced by fluorine, R² each independently is hydrogen, an alkyl group having 1 to 4 carbons or an alkoxy group having 1 to 4 carbons, at least one of R² is an alkoxy group having 1 to 4 carbons, q is an integer from 0 to 10, and x is a mole fraction.

6. The photoalignable polymer composition according to claim 1, wherein the photoalignable side-chain polymer of the first component includes at least one constitutional unit of the formula (I-3-1) below, and a constitutional unit derived from at least one monomer selected from the group consisting of carboxyl group-containing (meth)acrylate, carboxyl group-containing itaconate and phenolic hydroxyl group-containing (meth)acrylate, and the polymer of the second component includes a constitutional unit of the formula (II-1-1) below:

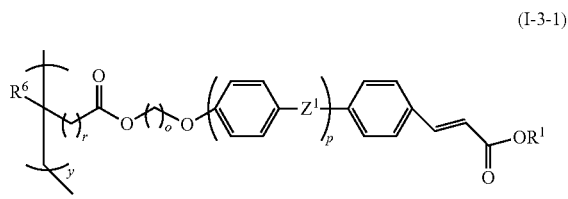
(I-3-1)

wherein, in the formula, R¹ is hydrogen or an alkyl group having 1 to 20 carbons in which arbitrary hydrogen may be replaced by fluorine, R⁶ is hydrogen, an alkyl group having 1 to 5 carbons in which arbitrary hydrogen may be replaced by fluorine, or a group of the formula (I-4) below, $Z^1$ is a single bond, —COO— or —OCO—, o is an integer from 2 to 10, p is an integer from 0 to 2, r is 0 or 1, y is a mole fraction satisfying a relationship: 0<y<1, and arbitrary hydrogen of a phenylene group may be replaced by fluorine, a methyl group or a methoxy group:

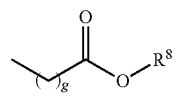
(I-4)

wherein, in the formula, R⁸ is hydrogen or a methyl group, and g is 0 or 1:

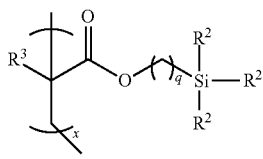
(II-1-1)

wherein, in the formula, R³ is hydrogen, an alkyl group having 1 to 20 carbons in which arbitrary hydrogen may be replaced by fluorine or an alkoxy group having 1 to 20 carbons in which arbitrary hydrogen may be replaced by fluorine, R² each independently is hydrogen, an alkyl group having 1 to 4 carbons or an alkoxy group having 1 to 4 carbons, at least one of R² is an alkoxy group having 1 to 4 carbons, q is an integer from 0 to 10, and x is a mole fraction.

7. The photoalignable polymer composition according to claim 1, wherein a ratio of the first component is in the range of 50.00 to 99.99% by mass and a ratio of the second component is in the range of 0.01 to 50.00% by mass, based on a total mass of the first component and the second component.

8. The photoalignable polymer composition according to claim 1, wherein a ratio of the first component is in the range of 70.00 to 99.50% by mass and a ratio of the second component is in the range of 0.50 to 30.00% by mass, based on a total mass of the first component and the second component.

9. The photoalignable polymer composition according to claim 1, containing at least one material selected from the group consisting of a sensitizer and a crosslinking agent in a range of 0.01 to 50% by mass based on a total mass of the first component and the second component.

10. The photoalignable polymer composition according to claim 1, containing at least one material selected from the group consisting of an acid compound, a thermal acid generator and a photoacid generator in a range of 0.01 to 50% by mass based on a total mass of the first component and the second component.

11. The photoalignable polymer composition according to claim 1, further containing a glycol solvent or a glycol ether solvent that can dissolve the first component and the second component.

12. A liquid crystal alignment film formed of the photoalignable polymer composition according to claim 1.

13. An optical device, comprising a phase difference plate prepared with the photoalignable polymer composition according to claim 1.

14. A patterned phase difference plate prepared from the photoalignable polymer composition according to claim 1.

* * * * *